US010439690B2

United States Patent
Rahman et al.

(10) Patent No.: US 10,439,690 B2
(45) Date of Patent: Oct. 8, 2019

(54) PRECODER CODEBOOK FOR ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/246,502

(22) Filed: Aug. 24, 2016

(65) Prior Publication Data

US 2017/0117943 A1    Apr. 27, 2017

Related U.S. Application Data

(60) Provisional application No. 62/245,694, filed on Oct. 23, 2015, provisional application No. 62/250,779, filed on Nov. 4, 2015.

(51) Int. Cl.
  *H04B 7/04*     (2017.01)
  *H04B 7/0456*   (2017.01)
  *H04B 7/06*     (2006.01)

(52) U.S. Cl.
  CPC ............ *H04B 7/0469* (2013.01); *H04B 7/04* (2013.01); *H04B 7/0478* (2013.01); *H04B 7/0486* (2013.01); *H04B 7/06* (2013.01)

(58) Field of Classification Search
  CPC ... H04B 7/0469; H04B 7/0478; H04B 7/0486
  See application file for complete search history.

(56) References Cited

U.S. PATENT DOCUMENTS

| 9,344,172 B2 * | 5/2016 | Nam ............... H04B 7/0482 |
| 2011/0249637 A1 * | 10/2011 | Hammarwall ....... H04B 7/0634 370/329 |
| 2013/0308715 A1 | 11/2013 | Nam et al. |

(Continued)

FOREIGN PATENT DOCUMENTS

EP    3046271 A1    7/2016

OTHER PUBLICATIONS

"Comparing Non-Precoded and Beamformed CSI-RS Enhancements," 3GPP TSG-RAN WG1 #81, R1-153166, Ericsson, Fukuoka, Japan, May 25-29, 2015, 9 pages.

(Continued)

*Primary Examiner* — Jean B Corrielus

(57) ABSTRACT

A method for operating user equipment (UE) in an advanced wireless communication network. The method comprises receiving, from an eNodeB (eNB), downlink signals indicating precoder codebook parameters that include a first number of antenna ports ($N_1$) for a first dimension, a second number of antenna ports ($N_2$) for a second dimension, and a codebook configuration, swapping precoder matrix indicator (PMI) expressions based on the $N_1$ and $N_2$, and the codebook configuration in order to derive a first PMI pair ($i_{1,1}$, $i_{1,2}$), and a second PMI ($i_2$) using a single precoder codebook, and transmitting, to the eNB, channel state information (CSI) including the first PMI pair and the second PMI.

20 Claims, 16 Drawing Sheets

(56) References Cited

U.S. PATENT DOCUMENTS

| | | | |
|---|---|---|---|
| 2014/0226702 A1* | 8/2014 | Onggosanusi | H04B 7/0469 375/219 |
| 2015/0280801 A1 | 10/2015 | Xin et al. | |
| 2016/0261328 A1* | 9/2016 | Kim | H04B 7/0632 |
| 2017/0207932 A1* | 7/2017 | Kim | H04L 5/00 |

OTHER PUBLICATIONS

"Discussion on Precoder and PMI Construction for FD-MIMO," 3GPP TSG RAN WG1#82bis, R1-155269, ZTE, Malmo, Sweden, Oct. 5-9, 2015, 9 pages.

"Rank 1-2 Codebook for Class A CSI Reporting," 3GPP TSG RAN WG1 Meeting #82b, R1-155492, Samsung, Malmo, Sweden, Oct. 5-9, 2015, 5 pages.

"Codebook Design for 12 and 8 Ports 2D Antenna Arrays," 3GPP TSG RAN WG1 Meeting #82bis, R1-155651, Huawei and HiSilicon, Malmo, Sweden, Oct. 5-9, 2015, 4 pages.

"KP-Based 2D Codebook and Performance Evaluations," 3GPP TSG RAN WG1 Meeting #82bis, R1-155793, CMCC, Malmo, Sweden, Oct. 5-9, 2015, 9 pages.

Foreign Communication From a Related Counterpart Application, PCT Application No. PCT/KR2016/011926, International Search Report and Written Opinion dated Jan. 26, 2017, 9 pages.

3GPP TSG-RAN WG1#82 WF on FD-MIMO codebook Samsung, ZTE, ALU, ASB, Ericsson, CATT Beijing, China, Aug. 24-28, 2015—7 Pages.

3GPP TSG-RAN WG1#82 WF on precoder and PMI construction for R13 FD-MIMO Samsung, LGE, CATT, Qualcomm, NTT Docomo, ZTE, Ericsson, ALU, ASB, AT&T, CMCC, KT; Beijing, China, Aug. 24-28, 2015—5 Pages.

3GPP TS 36.211 V12.2.0 (Jun. 2014) 3rd Generation Partnership Project;Technical Specification Group Radio Access Network; Evolved Universal Terrestrial Radio Access (E-UTRA); Physical channels and modulation (Release 12)—Jun. 2014—121 Pages.

3GPP TS 36.212 V12.2.0 (Sep. 2014) 3rd Generation Partnership Project;Technical Specification Group Radio Access Network; Evolved Universal Terrestrial Radio Access (E-UTRA); Multiplexing and channel coding (Release 12)—Sep. 2014—89 Pages.

3GPP TS 36.213 V12.2.0 (Jun. 2014) 3rd Generation Partnership Project;Technical Specification Group Radio Access Network; Evolved Universal Terrestrial Radio Access (E-UTRA); Physical layer procedures(Release 12)—Jun. 2014—207 Pages.

Communication from a foreign patent office in a counterpart foreign application, European Patent Office, "Supplementary European Search Report," Application No. EP 16857837.5, dated Oct. 11, 2018, 9 pages.

Samsung, "Rank 1-2 codebook for Class A CSI reporting," R1-156121, 3GPP TSG RAN WG1 Meeting #82b, Malmo, Sweden, Oct. 5-9, 2015, 14 pages.

Samsung, "Rank 3-8 codebook for Class A CSI reporting," R1-156122, 3GPP TSG RAN WG1 Meeting #82b, Malmo, Sweden, Oct. 5-9, 2015, 9 pages.

* cited by examiner

FIGURE 12

Alternative Configuration 3

PRECODER CODEBOOK FOR ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application No. 62/245,694, filed on Oct. 23, 2015, entitled "Precoder Codebook for Advanced Wireless Communication Systems" and U.S. Provisional Patent Application No. 62/250,779, filed on Nov. 4, 2015, entitled "Precoder Codebook for Advanced Wireless Communication Systems." The content of the above-identified patent documents are incorporated herein by reference.

TECHNICAL FIELD

The present application relates generally to codebook design for advanced wireless communication systems. More specifically, this disclosure relates to an efficient precoder codebook for advanced wireless communication systems.

BACKGROUND

Given the spatial multiplexing provided by FD-MIMO systems, understanding and correctly estimating the channel between a user equipment (UE) and an eNode B (eNB) is important for efficient and effective wireless communication. In order to correctly estimate the channel conditions, the UE will feedback information about channel measurement, e.g., channel state information (CSI), to the eNB. With this information about the channel, the eNB is able to select appropriate communication parameters to efficiently and effectively perform wireless data communication with the UE. However, with increase in the numbers of antennas and channel additional overheads, thus reducing the efficiency of the wireless communication, for example, decrease the data rate.

SUMMARY

Embodiments of the present disclosure provide a precoder codebook for advanced wireless communication systems.

In one embodiment, an apparatus of a user equipment (UE) is provided. The UE includes a transceiver configured to receive, from an eNodeB (eNB), downlink signals indicating precoder codebook parameters that include a first number of antenna ports ($N_1$) for a first dimension, a second number of antenna ports ($N_2$) for a second dimension, and a codebook configuration. The UE further includes at least one processor configured to swap precoder matrix indicator (PMI) expressions based on the $N_1$ and $N_2$, and the codebook configuration in order to derive a first PMI pair ($i_{1,1}$, $i_{1,2}$), and a second PMI ($i_2$) using a single precoder codebook, wherein the transceiver is further configured to transmit, to the eNB, channel state information (CSI) including the first PMI pair and the second PMI.

In another embodiment, an apparatus of an eNodeB (eNB) is provided. The apparatus includes a transceiver configured to transmit downlink signals, to a user equipment (UE), indicating precoder codebook parameters that include a first number of antenna ports ($N_1$) for a first dimension, a second number of antenna ports ($N_2$) for a second dimension, and a codebook configuration, and receive, from the UE, channel state information (CSI) including the first PMI pair and the second PMI. The apparatus further includes at least one processor configured to determine swap precoder matrix indicator (PMI) expressions based on the $N_1$ and $N_2$, and the codebook configuration in order to derive a first PMI pair ($i_{1,1}$, $i_{1,2}$), and a second PMI ($i_2$) using a single precoder codebook.

In yet another embodiment, a method for operating user equipment (UE) in an advanced wireless communication network is provided. The method comprises receiving, from an eNodeB (eNB), downlink signals indicating precoder codebook parameters that include a first number of antenna ports ($N_1$) for a first dimension, a second number of antenna ports ($N_2$) for a second dimension, and a codebook configuration, swapping precoder matrix indicator (PMI) expressions based on the $N_1$ and $N_2$, and the codebook configuration in order to derive a first PMI pair ($i_{1,1}$, $i_{1,2}$), and a second PMI ($i_2$) using a single precoder codebook, and transmitting, to the eNB, channel state information (CSI) including the first PMI pair and the second PMI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code.

The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates another example orthogonal beam grouping for rank 5-8 according to embodiments of the present disclosure;

DETAILED DESCRIPTION

FIG. 1 through FIG. 16D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v12.2.0, "E-UTRA, Physical channels and modulation" (REF1); 3GPP TS 36.212 v12.2.0, "E-UTRA, Multiplexing and Channel coding" (REF2); 3GPP TS 36.213 v12.2.0, "E-UTRA, Physical Layer Procedures" (REF3); R1-154861, "WF on FD-MIMO codebook" (REF4); and R1-155005, "WF on precoder and PMI construction for R13 FD-MIMO."

Figure 1:
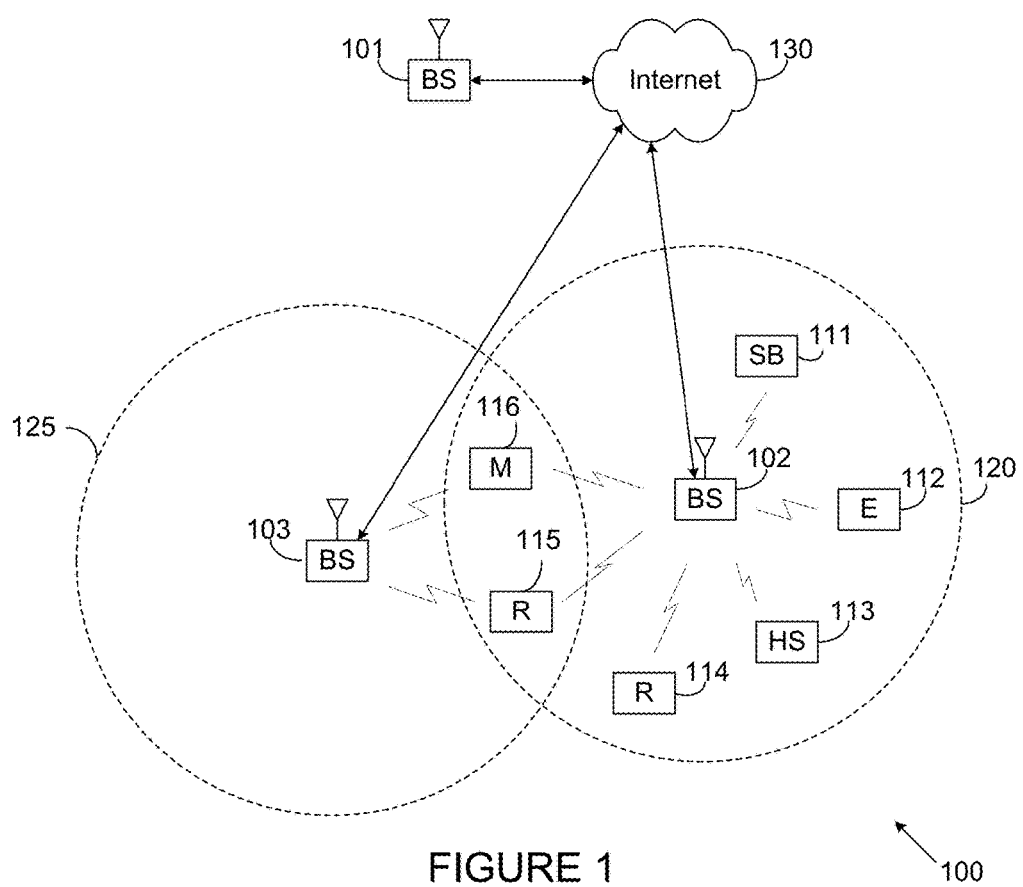
FIG. 1 illustrates an example wireless network according to embodiments of the present disclosure.
Figure 2:
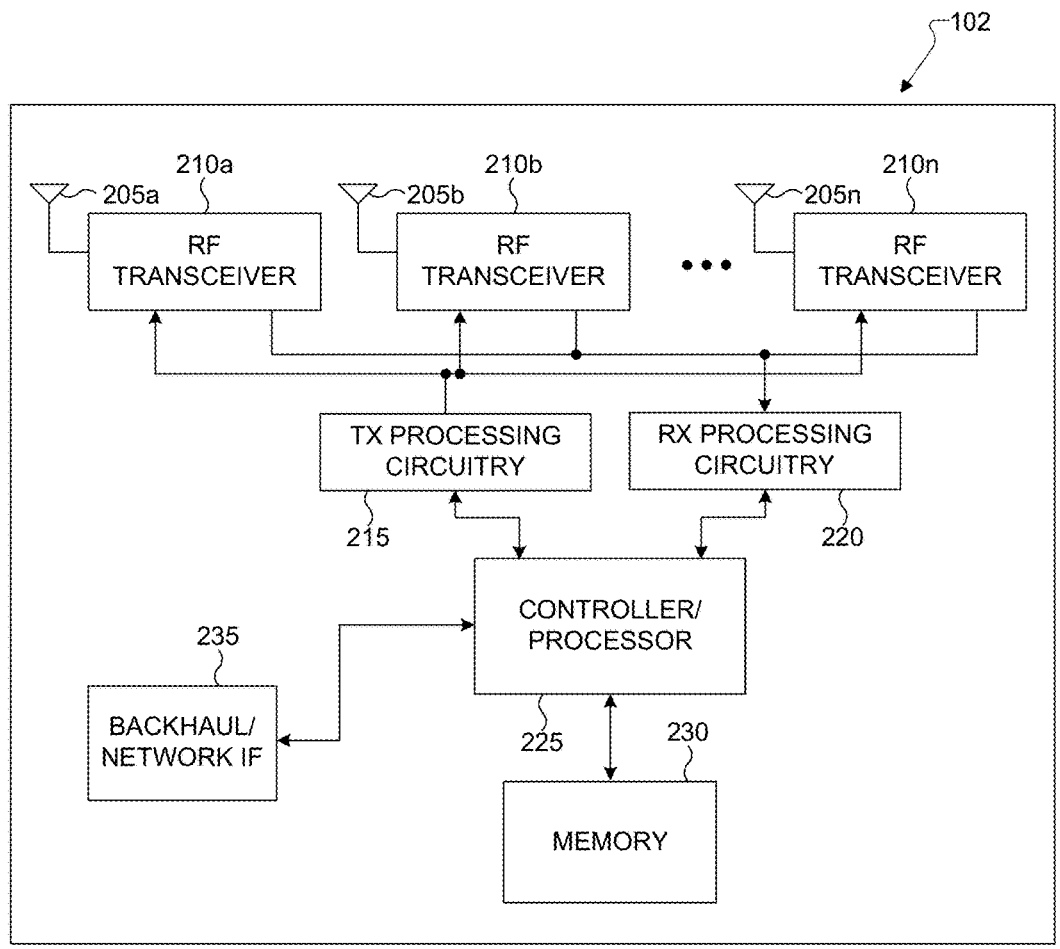
FIG. 2 illustrates an example eNB according to embodiments of the present disclosure.
Figure 3:
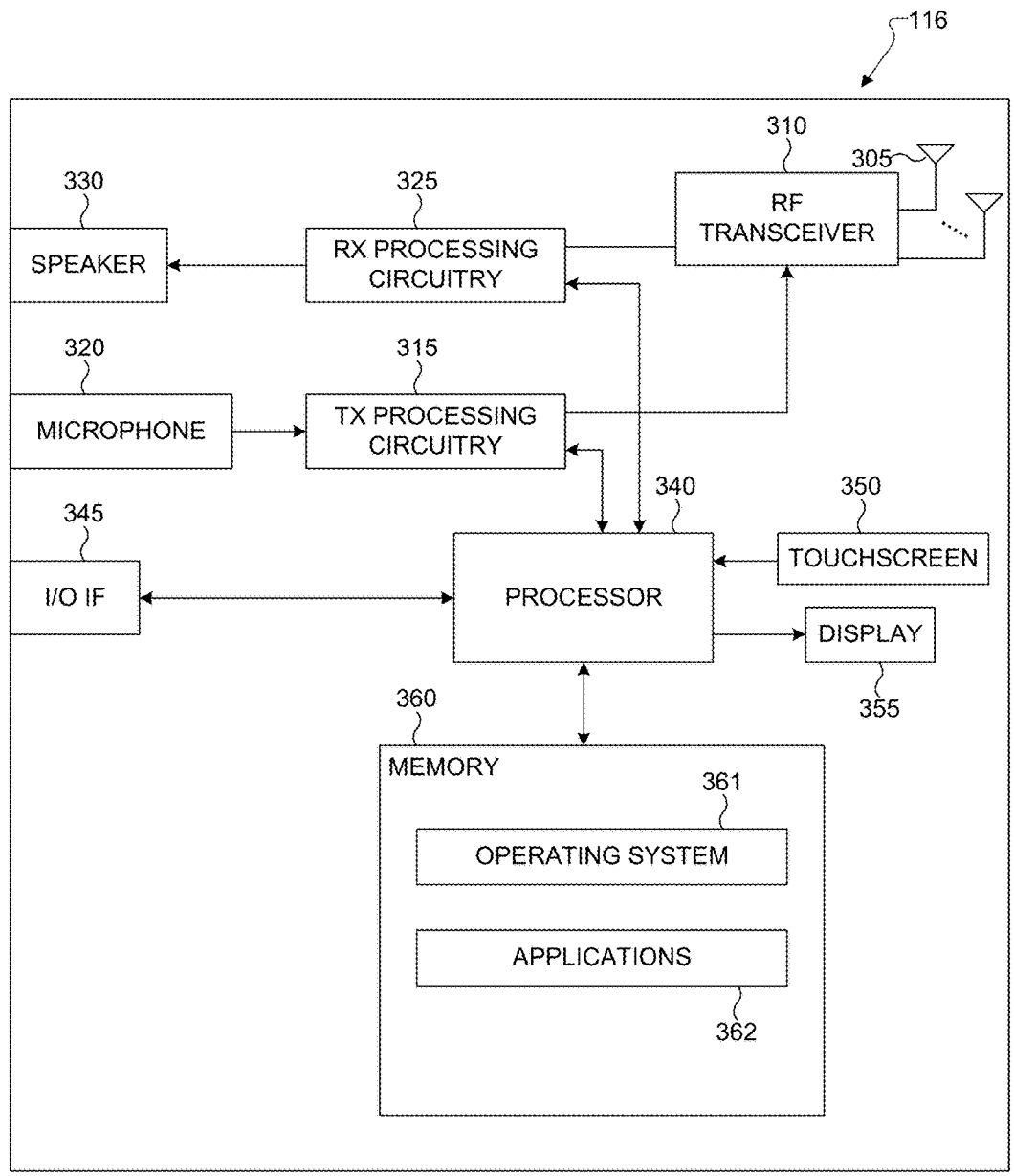
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for precoder codebook processing. In certain embodiments, and one or more of the eNBs 101-103 includes circuitry, programming, or a combination thereof, for processing of channel state information (CSI) received from the UEs 111-116 in accordance with a first number of antenna ports ($N_1$) for a first dimension and a second number of antenna ports ($N_2$) for a second dimension.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-210n is also capable of transmitting downlink signals, to a user equipment (UE), including the single precoder codebook parameters, wherein a precoder matrix indicator (PMI) expression based on a codebook configuration in accordance with the single precoder codebook parameters is swapped at the UE. In some embodiment, the RF transceiver 210a-210n is also capable of receiving, from the UE, a reporting message including channel state information (CSI) based on the $N_1$ and $N_2$.

In some embodiments, the RF transceiver 210a-210n is also capable of transmitting downlink signals, to the UE, including the single precoder codebook parameters, wherein the PMI expression based on the codebook configuration in accordance with the precoder codebook parameter is parameterized based on a pair of parameters comprising ($d_1$, $d_2$) in accordance with the $N_1$ and $N_2$.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of CSI received from the UE 111-116 in accordance with a first number of antenna ports ($N_1$) for a first dimension and a second number of antenna ports ($N_2$) for a second dimension. For example, controller/processor 225 can be configured to execute one or more instructions, stored in memory 230, that are configured to cause the controller/processor to process CSI received from the UE 111-116 in accordance with a first number of antenna ports ($N_1$) for a first dimension and a second number of antenna ports ($N_2$) for a second dimension.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a plurality of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the plurality of antennas 305, an incoming RF signal transmitted by an eNB of the wireless network 100. The RF transceiver 310 downconverts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is also capable of receiving, from an eNodeB (eNB), downlink signals indicating precoder codebook parameters that comprise a first number of antenna ports ($N_1$) for a first dimension and a second number of antenna ports ($N_2$) for a second dimension The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the plurality of antennas 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for identifying a codebook configuration based on a single precoder codebook in accordance with the $N_1$ and $N_2$ and swapping precoder matrix indicator (PMI) expressions based on the identified codebook configuration, wherein the transceiver is further configured to transmit, to the eNB, a reporting message including channel state information (CSI) based on the $N_1$ and $N_2$.

In some embodiments, the processor 340 is also capable of determine dummy variables based on a pair of parameters comprising ($d_1$, $d_2$) in accordance with the $N_1$ and $N_2$, the dummy variables being determined as $i_{1,d1}=x$ and $i_{1,d2}=y$. Wherein a rank-1 codebook for a codebook configuration 3 is determined based on the dummy variables.

In some embodiments, the processor 340 is also capable of identifying a pair of parameters comprising ($d_1$, $d_2$) based on the $N_1$ and $N_2$ and parameterizing a codebook table based on the identified pair of parameters ($d_1$, $d_2$). ($d_1$, $d_2$) are defined as at least one of ($d_1$, $d_2$)=(1,2) when the $N_1$ is greater or equal to the $N_2$ or ($d_1$, $d_2$)=(2,1) when the $N_1$ is less than the $N_2$. In one example, when the ($d_1$, $d_2$)=(1,2), a master codebook for a 1 layer CSI reporting is determined. In another example, when the ($d_1$, $d_2$)=(2,1), the master codebook for the 1 layer CSI reporting is determined.

In some embodiments, the processor 340 is also capable of determining a first discrete fourier transform (DFT) vector ($v_m$) representing a vertical beam for the first dimension and a second DFT vector ($u_n$) representing a horizontal DFT beam for the second dimension; and swapping the PMI expressions in a rank 1 codebook and a rank 2 codebook for a codebook configuration 3 and a codebook configuration 4 based on the determined first and second DFT vectors. In such embodiments, the swapped PMI expressions comprise an order of ($m_1$, $n_2$) based on the $N_1$ and $N_2$. In one example, when the $N_1$ is greater or equals to the $N_2$, a rank 1 precoder based on the swapped PMI expressions is determined as $$W^{(1)}_{m_1,m_2,n} = \frac{1}{\sqrt{Q}}\begin{bmatrix} w_{m_2,m_1} \\ \varphi_n w_{m_2,m_1} \end{bmatrix},$$

where $v_{m_1} \otimes u_{m_2}$ is $w_{m_1,m_2}$. In another example, when the $N_1$ is less than the $N_2$, the rank 1 precoder based on the swapped PMI expression is determined as $$W^{(1)}_{m_1,m_2,n} = \frac{1}{\sqrt{Q}}\begin{bmatrix} w_{m_2,m_1} \\ \varphi_n w_{m_2,m_1} \end{bmatrix},$$

where $v_{m_1} \otimes u_{m_2}$ is $w_{m_1,m_2}$.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers.

The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
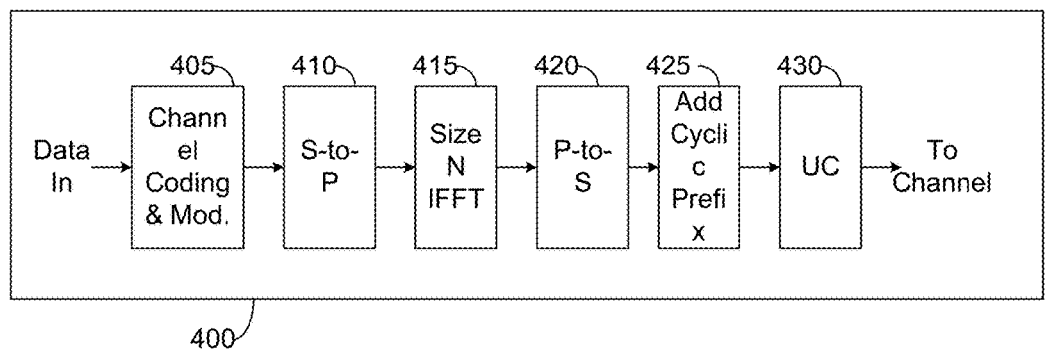
FIG. 4A illustrates a high-level diagram of an orthogonal frequency division multiple access transmit path according to embodiments of the present disclosure.
Figure 4B:
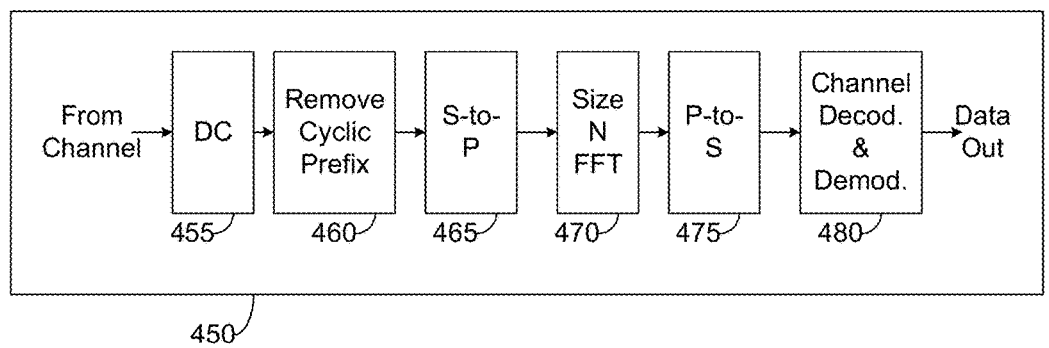
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 5:
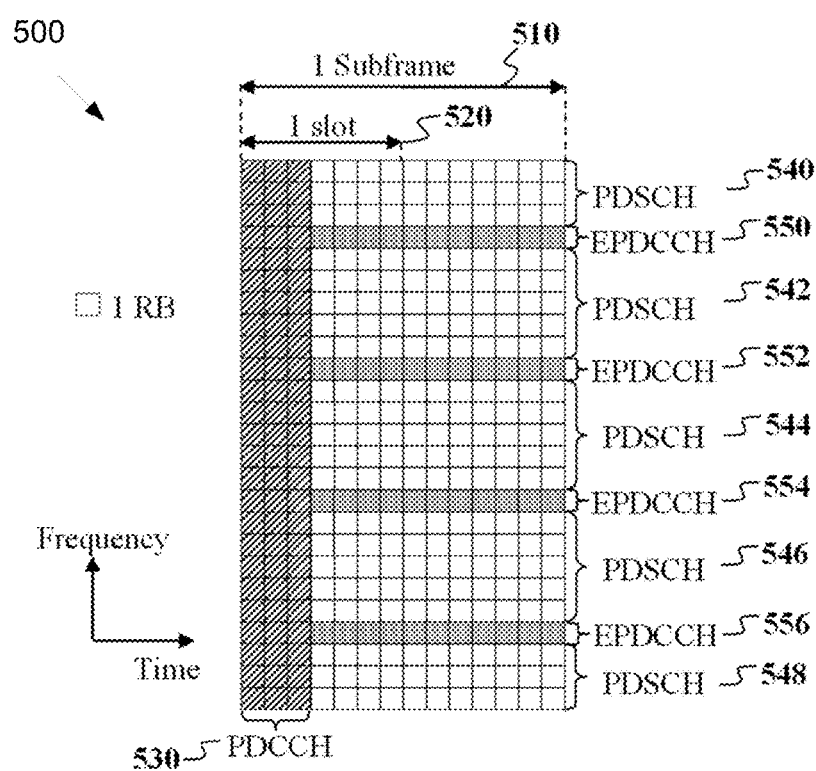
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining $N_{symb}^{DL} - M_{symb}^{DL}$ SF symbols are primarily used to symb transmit physical downlink shared channels (PD-SCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to M.sub.PDSCH RBs for a total of $M_{sc}^{PDSCH} = M_{PDSCH} \cdot N_{sc}^{RB}$ REs for a PDSCH transmission BW. An EPDCCH transmission is achieved in either one RB or multiple of RBs.

Figure 6:
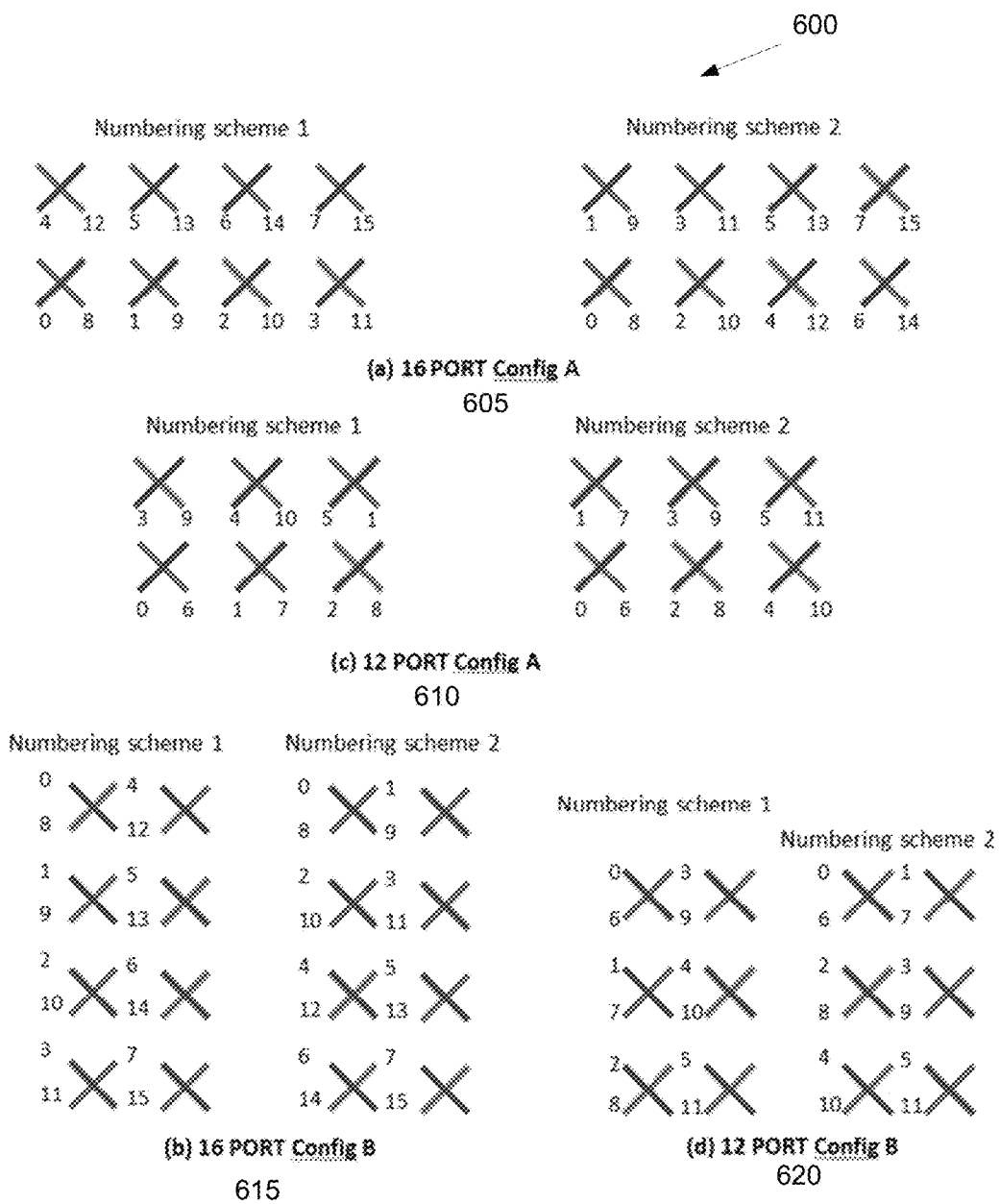
FIG. 6 illustrates an example antenna configurations and numbering according to embodiments of the present disclosure.

FIG. 6 illustrates an example antenna configurations and numbering 600 according to embodiments of the present disclosure. An embodiment of the antenna configurations and numbering 600 shown in FIG. 6 is for illustration only. Other embodiments may be used without departing from the scope of the present disclosure. As shown in FIG. 6, the antenna configurations and numbering 600 comprise a 16 port configuration A 605, a 12 port configuration A 610, a 16 port configuration B 615, and a 12 port configuration B 620.

As shown in FIG. 6, in all of the four antenna configurations (e.g., 12 port configuration A and B, and 16 port configuration A and B), a cross pol (or X-pol) antenna array is considered, in which a pair of antenna elements in the same physical location is polarized in two distinct angles (e.g., +45 degrees and −45 degrees). More specifically, the 16 port configuration A 605 and the 16 port configuration B 615 are antenna configurations with 16 CSI-RS ports comprising 8 pairs of x-pol antenna elements placed in a 2D antenna panel. The 8 pairs can be placed in 2×4 (e.g., 605) or 4×2 manner (e.g., 615) on horizontal and vertical dimensions. In addition, the 12 port configuration 610 and the 12 port configuration B 620 are antenna configurations with 12 CSI-RS ports comprising 6 pairs of x-pol antenna elements placed in a 2D antenna panel. The 6 pairs can be placed in 2×3 (e.g., 610) or 3.times.2 manner (e.g., 620) on horizontal and vertical dimensions.

In some embodiments, antennas are indexed with integer numbers, 0, 1, . . . , 15 for 16-port configurations (e.g., 605, 610), and 0, . . . , 11 for 12-port configurations (e.g., 610, 620). In fat arrays (such as 12-port configuration 610 A and 16-port configuration A 605), antenna numbers are assigned such that consecutive numbers are assigned for all the antenna elements for a first polarization and proceed to a second polarization. For a given polarization, there may be some different numbering schemes. In one example (e.g., numbering scheme 1), consecutive numbers are assigned for a first row with progressing one edge to another edge and proceed to a second row. In another example (e.g., numbering scheme 2), consecutive numbers are assigned for a first column with progressing one edge to another edge and proceed to a second column.

For example, in the 16 port configuration A 605, antenna numbers 0-7 are assigned for a first polarization and 8-15 are assigned for a second polarization, and antenna numbers 0-3 are assigned for a first row and 4-7 are assigned for a second row. Antenna numbers in tall arrays (such as the 12-port configuration B 620 and the 16-port configuration B 615) are obtained by simply rotating the fat antenna arrays (such as the 12-port configuration A 610 and 16-port configuration A 605) by 90 degrees.

In some embodiments, when a UE is configured with 12 or 16 port CSI-RS for a CSI-RS resource, the UE is configured to report a PMI feedback precoder according to the antenna numbers as shown FIG. 6. A rank-1 precoder, $W_{m,n,p}$, which is an $N_{CSIRS} \times 1$ vector, to be reported by the UE is given by:

$$W_{m,n,p} = [w_0 \ w_1 \ \cdots \ w_{N_{CSIRS}-1}]^t = \frac{1}{\sqrt{N_{CSIRS}}} \begin{bmatrix} v_m \otimes u_n \\ \varphi_p(v_m \otimes u_n) \end{bmatrix}$$

where $N_{CSIRS}$=number of configured CSI-RS ports in the CSI-RS resource (e.g., 12, 16, etc.), $u_n$ is a N×1 oversampled DFT vector for a second dimension, whose oversampling factor is $S_N$, $v_m$ is a M×1 oversampled DFT vector for a first dimension, whose oversampling factor is $S_M$, and $\varphi_p$ is a co-phase (e.g., in a form of $$e^{j\frac{2\pi p}{4}},$$

p=0,1,2,3).

The dimension assignment can be done with N≥M according to the numbering scheme 1 as shown in FIG. 6, with (N, M)∈{(4,2), (4,3), (2,2)}; alternatively, the dimension assignment can be done with N≤M with swapping the role of columns and rows, with (N, M)∈{(2,4), (3,4), (2,2)} according to the numbering scheme 2 as shown in FIG. 6. In one example, a set of oversampling factors that can be configured for $S_N$ and $S_M$ are {2, 4, 8}; and m, m' ∈{0, 1, . . . , $S_M M$} and n, n' ∈{0,1, . . . , $S_N N$}. In a special case, m=m' and n=n'.

When any of 16-port configuration A 605 and B 615 for numbering scheme 1 in FIG. 6 is used at an eNB with configuring $N_{CSIRS}$=16 to a UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 may be configured for $v_m$ and $u_n$.

If 16-port configuration A 605 is used, $u_n$ is a 4×1 vector representing a horizontal DFT beam and $v_m$ is a 2×1 vector representing a vertical DFT beam. If 16-port configuration B 615 is used, $u_n$ is a 4×1 vector representing a vertical DFT beam and $v_m$ is a 2×1 vector representing a horizontal DFT beam.

With 12 or 16-port configurations, $v_m$ can be written as:

$$v_m = \begin{bmatrix} 1 & e^{j\frac{2\pi m}{M'}} \end{bmatrix}^t = \begin{bmatrix} 1 & e^{j\frac{2\pi m}{MS_M}} \end{bmatrix}^t.$$

With 16-port configurations, $u_n$ can be written as:

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t = \begin{bmatrix} 1 & e^{j\frac{2\pi n}{NS_n}} & e^{j\frac{4\pi n}{NS_n}} & e^{j\frac{6\pi n}{NS_n}} \end{bmatrix}^t.$$

With 12-port configurations, $u_n$ can be written as:

$$u_n = \begin{bmatrix} 1 & e^{j\frac{2\pi n}{N'}} & e^{j\frac{4\pi n}{N'}} \end{bmatrix}^t = \begin{bmatrix} 1 & e^{j\frac{2\pi n}{NS_n}} & e^{j\frac{4\pi m}{NS_n}} \end{bmatrix}^t.$$

Figure 7:
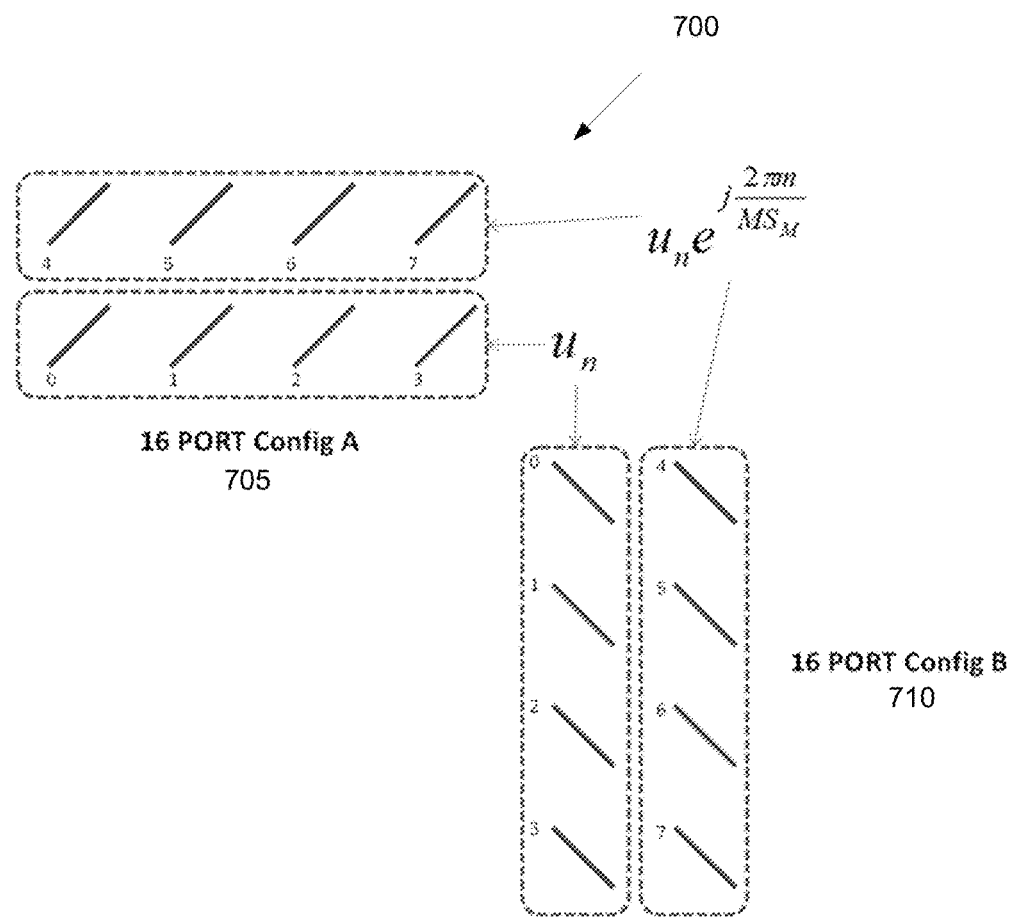
FIG. 7 illustrates an example precoding weight application to antenna configurations according to embodiments of the present disclosure.

FIG. 7 illustrates an example precoding weight application 700 to antenna configurations according to embodiments of the present disclosure. An embodiment of the precoding weight application 700 to antenna configurations shown in FIG. 7 is for illustration only. Other embodiments may be used without departing from the scope of the present disclosure. As shown in FIG. 7, the precoding weight application 700 comprises a 16 port configuration A 705 and a 16 port configuration B 710.

Precoding weights to be applied to antenna port numbers 0 through 3 in the 16 port configuration A 705 and B 710 are $u_n$, and the precoding weights to be applied to antenna ports numbers 4 through 7 in the 16 port configuration A 705 and B 710 are $$u_n e^{j\frac{2\pi n}{MS_M}}$$

with an appropriate power normalization factor. Similarly, precoding weights to be applied to antenna port numbers 8 through 11 are $u_{n'}$, and the precoding weights to be applied to antenna ports 12 through 15 are $$u_{n'} e^{j\frac{2\pi n}{MS_M}}$$

with an appropriate power normalization factor. The number ring scheme 1 and 2 in FIG. 6 may be applied to the precoding weight application 700 as shown in FIG. 7.

Figure 8:
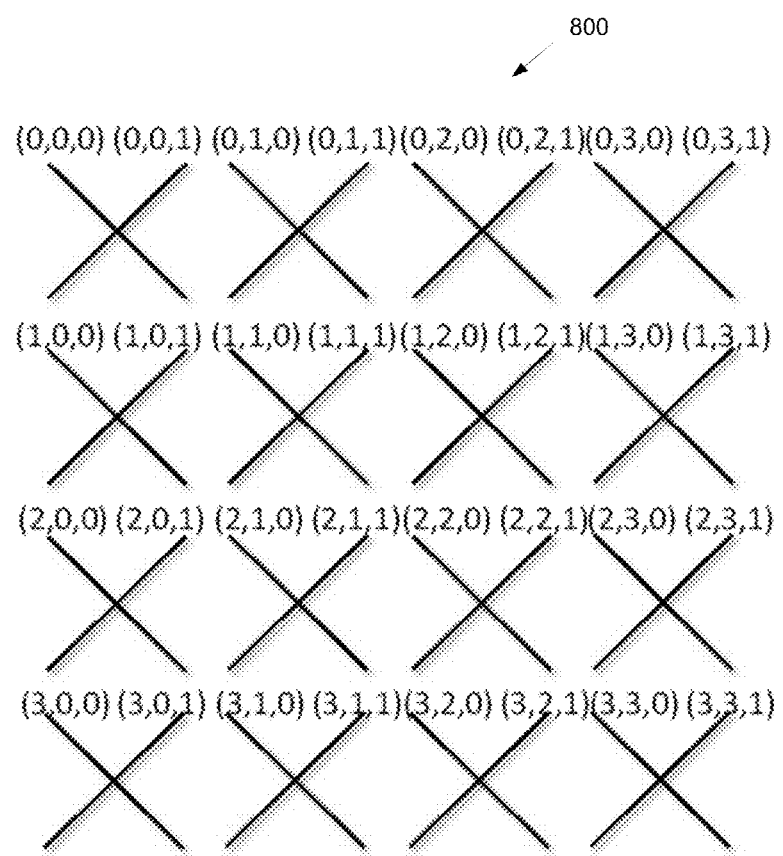
FIG. 8 illustrates an example antenna element (or transmit resource unit (TXRU)) numbering according to embodiments of the present disclosure.

FIG. 8 illustrates an example antenna element (or transmit resource unit (TXRU)) numbering 800 according to embodiments of the present disclosure. An embodiment of the antenna element (or transmit resource unit (TXRU)) numbering 800 shown in FIG. 8 is for illustration only. Other embodiments may be used without departing from the scope of the present disclosure.

In some embodiments, an eNB is equipped with 2D rectangular antenna array (or TXRUs) comprising M rows and N columns with P=2 polarized, wherein each element (or TXRU) comprising M rows and N columns with P=2 polarized, wherein each element (or TXRU) is indexed with (m, n, p), and m=0, . . . , M−1, n=0, . . . , N−1, p=0, . . . , P−1, as shown in FIG. 8 with M=N=4. When FIG. 8 represents a TXRU array, the TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array as shown in FIG. 8.

In some embodiments, a UE is configured with a CSI-RS resource comprising Q=MNP number of CSI-RS ports, wherein the CSI-RS resource is associated with MNP number of resource elements (REs) in a pair of PRBs in a subframe.

In some embodiments, a UE is configured with a CSI-RS configuration via higher layer, configuring Q antenna ports—antenna ports A(1) through A(Q). The UE is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number of antenna ports per pol for a first dimension, and a second number of antenna ports per pol for a second dimension, wherein $Q=PN_1N_2$.

In some embodiments, the first dimension may correspond to the horizontal direction or columns, and the second dimension may correspond to the vertical direction or rows, i.e., $(N_1, N_2)=(N, M)$.

In some embodiments, the first dimension may correspond to the vertical direction or rows, and the second dimension may correspond to the horizontal direction or columns, i.e., $(N_1, N_2)=(M, N)$.

In the rest of the disclosure, a notation $(N_1, N_2)$ will be used in place of (M, N) or (N, M). Similarly, a notation $(O_1, O_2)$ will be used for the oversampling factors in the two dimensions in place of $(S_N, S_M)$ or $(S_M, S_N)$.

A beam grouping scheme and a codebook can be defined in terms of two groups of parameters and one group per dimension. A group of parameters for dimension d comprises at least one of a number of antenna ports per pol $N_d$, an oversampling factor $O_d$, a skip number (or beam group spacing) $s_d$ (e.g., for W1), a beam offset number $f_d$, a beam spacing number $p_d$ (e.g., for W2), or a number of beams (in each beam group) $L_d$.

A beam group indicated by a first PMI $i_{1,d}$ of dimension d (corresponding to $W_d^{(1)}$) is determined based upon some parameters. For example, a total number of beams is $N_d \cdot O_d$ and the beams are indexed by an integer $m_d$, wherein beam $m_d$, $v_{m_d}$, corresponds to a precoding vector $$v_{m_d} = \begin{bmatrix} 1 & e^{j\frac{2\pi m_d}{O_d N_d}} & \cdots & e^{j\frac{2\pi m_d(N_d-1)}{O_d N_d}} \end{bmatrix}^t,$$

$m_d=0, \ldots, N_d \cdot O_d-1$. The first PMI of the first dimension $i_{1,d}$, $i_{1,d}=0, \ldots, N_d \cdot O_d/s_d-1$, can indicate any of $L_d$ beams indexed by $m_d=f_d+s_d \cdot i_{1,d}, f_d+s_d \cdot i_{1,d}+p_d, \ldots, f_d+s_d \cdot i_{1,d}+(L_d-1) p_d$, wherein these $L_d$ beams are referred to as a beam group.

Class A codebook in LTE specification may be configured with some RRC parameters, for example, $N_1, N_2=\{1,2,3,4,8\}$ where the valid candidates are $(N_1, N_2)=(8, 1), (2, 2), (2, 3), (3, 2), (2, 4), (4, 2),$ and $O_1, O_2=\{2,4,8\}$, and Config=$\{1, 2, 3, 4\}$. For dimension with one port, an oversampling factor and Config=$\{2, 3\}$ may not be applied to. In this example, for each $(N_1, N_2)$, configurability of $(O_1, O_2)$ is restricted to two possible fixed pairs as shown in TABLE 1.

TABLE 1

| (N1, N2) | (O1, O2) combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

Given the set of values of $N_1, N_2, O_1, O_2$, $W_1$ matrices with $(L'_1, L'_2)=(4,2), (2,4)$ are constructed for $N_1 \geq N_2$ and $N_1 < N_2$, respectively. In this instance, $$W_1 = \begin{pmatrix} X_1^{m_1} \otimes X_2^{m_2} & 0 \\ 0 & X_1^{m_1} \otimes X_2^{m_2} \end{pmatrix}$$

where $m_1$ is the index for $X_i$ and an associated codebook table is defined in terms of $i'_2, i_{1,1}$ and $i_{1,2}$.

Given the value of Config, a subset of codewords from the codebook table is selected as an active subset of values of $i'_2$, associated with at least one of configurations, for example, Config=1: $(L_1, L_2)=(1,1)$ for rank 1-2, Config=2: $(L_1, L_2)=(2,2)$ for rank 1-2 [square], Config=3: $(L_1, L_2)=(2, 2)$ for rank 1-2 [non-adjacent 2D beams/checkerboard], Config=4: $(L_1, L_2)=(4, 1), (1, 4)$ for $N_1 \geq N_2$ and $N_1 < N_2$ respectively for rank 1-2, or TBD rank 3-8.

TABLE 2

| $i_2'$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2'$ | 4 | 5 | 6 | 7 |
| Precoder | $W_{s_1 i_{1,1}+1, s_2 i_{1,2}, 0}^{(1)}$ | $W_{s_1 i_{1,1}+1, s_2 i_{1,2}, 1}^{(1)}$ | $W_{s_1 i_{1,1}+1, s_2 i_{1,2}, 2}^{(1)}$ | $W_{s_1 i_{1,1}+1, s_2 i_{1,2}, 3}^{(1)}$ |
| $i_2'$ | 8 | 9 | 10 | 11 |
| Precoder | $W_{s_1 i_{1,1}+2, s_2 i_{1,2}, 0}^{(1)}$ | $W_{s_1 i_{1,1}+2, s_2 i_{1,2}, 1}^{(1)}$ | $W_{s_1 i_{1,1}+2, s_2 i_{1,2}, 2}^{(1)}$ | $W_{s_1 i_{1,1}+2, s_2 i_{1,2}, 3}^{(1)}$ |
| $i_2'$ | 12 | 13 | 14 | 15 |
| Precoder | $W_{s_1 i_{1,1}+3, s_2 i_{1,2}, 0}^{(1)}$ | $W_{s_1 i_{1,1}+3, s_2 i_{1,2}, 1}^{(1)}$ | $W_{s_1 i_{1,1}+3, s_2 i_{1,2}, 2}^{(1)}$ | $W_{s_1 i_{1,1}+3, s_2 i_{1,2}, 3}^{(1)}$ |
| $i_2'$ | 16-31 | | | |
| Precoder | Entries 16-31 constructed with replacing the second subscript $s_2 i_{1,2}$ with $s_2 i_{1,2} + 1$ in entries 0-15. | | | |

TABLE 2 shows a master codebook for 1 layer CSI reporting (with 32 CWs, $(L'_1, L'_2)=(4, 2)$). A UE selects 4 or 16 CWs for the second PMI $i_2$ to be reported on PUSCH, based on Config from TABLE 3, wherein the corresponding rank 1 precoder is given by:

$$W_{m_1, m_2, n}^{(1)} = \frac{1}{\sqrt{Q}} \begin{bmatrix} v_{m_1} \otimes u_{m_2} \\ \varphi_n v_{m_1} \otimes u_{m_2} \end{bmatrix},$$

where $v_{m_1} = \begin{bmatrix} 1 & e^{j\frac{2\pi m_1}{O_1 N_1}} & \dots & e^{j\frac{2\pi m_1(N_1-1)}{O_1 N_1}} \end{bmatrix}^t$, $u_{m_2} = \begin{bmatrix} 1 & e^{j\frac{2\pi m_2}{O_2 N_2}} & \dots & e^{j\frac{2\pi m_2(N_2-1)}{O_2 N_2}} \end{bmatrix}^t$, and $\varphi_n = e^{j\frac{\pi n}{2}}$.

TABLE 3

Figure 16A:
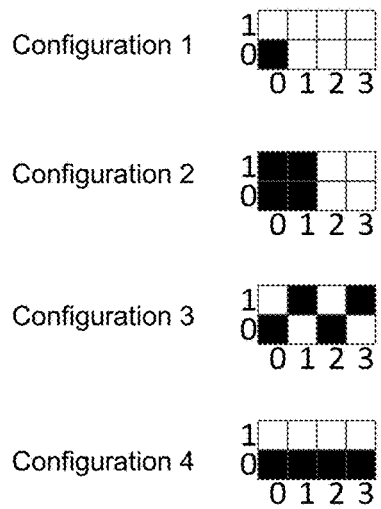
FIG. 16A depicts configurations for TABLE 3.

| Configuration (e.g., Config) See FIG. 16A | Selected $i'_2$ indices | $(s_1, s_2)$ |
|---|---|---|
| Configuration 1 | 0-3 | (1, 1) |
| Configuration 2 | 0-7, 16-23 | (2, 2) |
| Configuration 3 | 0-3, 8-11, 20-23, 28-31 | (2, 2) |
| Configuration 4 | 0-15 | (2, 2) |

Note that TABLE 2 is applicable to $N_1 \geq N_2$. For $N_1 < N_2$, $(L'_1, L'_2)=(2, 4)$ may be used. Accordingly, the codebook table needs to modified so that it can be used for $N_1 < N_2$ configuration also.

Since the antenna port configurations $(N_1, N_2)$ are symmetric in the sense that the antenna port layouts are transpose of one another. For example $(N_1, N_2)=(2,4)$ and $(4,2)$ for 16 port and $(N_1, N_2)=(2,3)$ and $(3,2)$ as shown in FIG. 6. For such antenna port layouts, the same codebook table may be used for representing the different pre-coding vectors and matrices in the two layouts.

In some embodiments, there is one (master) codebook table for both of symmetric antenna port configurations. In this case, two symmetric port configurations may be defined for $N_1 \geq N_2$ (configuration A) and $N_1 < N_2$ (configuration B) as shown FIG. 6. However, depending on the configured antenna port configuration, the pre-coder may be derived differently.

In some embodiments, an order of $(m_1, m_2)$ in $W_{m_1, m_2, n}^{(1)}$ expression is swapped dependent on a configuration. For instance, for the configuration in which $N_1 \geq N_2$, the order is $(m_1, m_2)$, and the UE derives the rank-1 pre-coder as $$W_{m_1, m_2, n}^{(1)} = \frac{1}{\sqrt{Q}} \begin{bmatrix} v_{m_1} \otimes u_{m_2} \\ \varphi_n v_{m_1} \otimes u_{m_2} \end{bmatrix},$$

and for the configuration in which $N_1 < N_2$, the order is $(m_2, m_1)$, and the UE derives the rank-1 pre-coder as $$W_{m_1, m_2, n}^{(1)} = \frac{1}{\sqrt{Q}} \begin{bmatrix} v_{m_2} \otimes u_{m_1} \\ \varphi_n v_{m_2} \otimes u_{m_1} \end{bmatrix}.$$

For example, assuming antenna port numbering 2 for a 16 port configuration, the configuration may be given by:

$$(N_1, N_2) = (4, 2), \text{ and } v_{m_1} = \begin{bmatrix} 1 & e^{j\frac{2\pi m_1}{O_1 N_1}} & e^{j\frac{4\pi m_1}{O_1 N_1}} & e^{j\frac{6\pi m_1}{O_1 N_1}} \end{bmatrix}^t,$$

$$\text{and } u_{m_2} = \begin{bmatrix} 1 & e^{j\frac{2\pi m_2}{O_2 N_2}} \end{bmatrix}^t; \text{ and } (N_1, N_2) = (2, 4),$$

$$\text{and } v_{m_2} = \begin{bmatrix} 1 & e^{j\frac{2\pi m_2}{O_1 N_1}} \end{bmatrix}^t,$$

$$\text{and } u_{m_1} = \begin{bmatrix} 1 & e^{j\frac{2\pi m_1}{O_2 N_2}} & e^{j\frac{4\pi m_1}{O_2 N_2}} & e^{j\frac{6\pi m_1}{O_2 N_2}} \end{bmatrix}^t.$$

Similarly, for 12 port configuration, the configuration may be given by:

$$(N_1, N_2) = (3, 2), \text{ and } v_{m_1} = \begin{bmatrix} 1 & e^{j\frac{2\pi m_1}{O_1 N_1}} & e^{j\frac{4\pi m_1}{O_1 N_1}} \end{bmatrix}^t,$$

$$\text{and } u_{m_2} = \begin{bmatrix} 1 & e^{j\frac{2\pi m_2}{O_2 N_2}} \end{bmatrix}^t; \text{ and } (N_1, N_2) = (2, 3),$$

$$\text{and } v_{m_2} = \begin{bmatrix} 1 & e^{j\frac{2\pi m_2}{O_1 N_1}} \end{bmatrix}^t, \text{ and } u_{m_1} = \begin{bmatrix} 1 & e^{j\frac{2\pi m_1}{O_2 N_2}} & e^{j\frac{4\pi m_1}{O_2 N_2}} \end{bmatrix}^t.$$

Note that with this swapping, the dimensions of the two vectors to the left and to the right of Kronecker operator are swapped in the two expressions.

In some embodiments, $v_{m_1} \otimes u_{m_2}$ is presented as $w_{m_1, m_2}$. In this case, the alternate expression for rank-1 pre-coder is given by $$W^{(1)}_{m_1,m_2,n} = \frac{1}{\sqrt{Q}} \begin{bmatrix} w_{m_1,m_2} \\ \varphi_n w_{m_1,m_2} \end{bmatrix}$$

for $(N_1 \geq N_2)$ and $$W^{(1)}_{m_1,m_2,n} = \frac{1}{\sqrt{Q}} \begin{bmatrix} w_{m_2,m_1} \\ \varphi_n w_{m_2,m_1} \end{bmatrix}$$

for $(N_1 < N_2)$. According to these alternatives, the expressions for rank 2-8 pre-coders are determined.

TABLE 4 shows four configurations for rank-2 and TABLES 5A and 5B show a master codebook for 2 layers CSI reporting.

TABLE 4

Figure 16B:
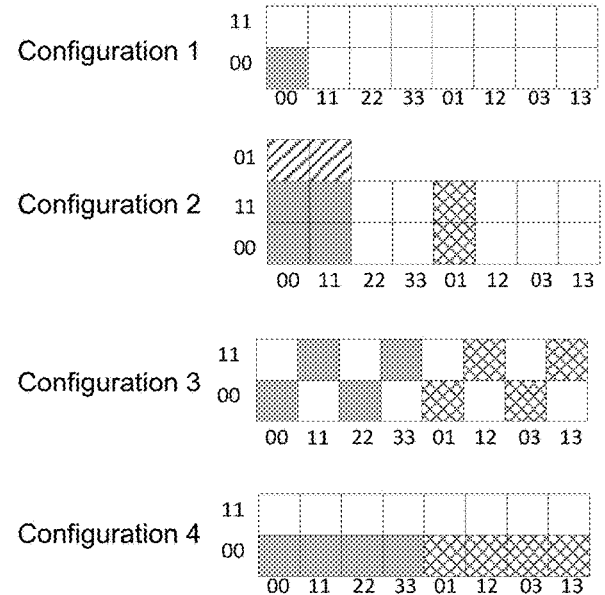
FIG. 16B depicts configurations for TABLE 4.

| Configuration (e.g., Config) See FIG. 16B | Selected $i'_2$ indices | $(s_1, s_2)$ |
|---|---|---|
| Configuration 1 | 0-1 | (1, 1) |
| Configuration 2 | 0-3, 8-9, 16-19, 22-23, 28-31 | (2, 2) |
| Configuration 3 | 0-1, 4-5, 8-9, 12-13, 18-21, 24-27 | (2, 2) |
| Configuration 4 | 0-15 | (2, 2) |

TABLE 5A

| $i'_2$ | 0 | 1 |
|---|---|---|
| Precoder | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ |
| $i'_2$ | 2 | 3 |
| Precoder | $W^{(2)}_{s_1 i_{1,1}+p_1, s_2 i_{1,2}, s_1 i_{1,1}+p_1, s_2 i_{1,2}, 0}$ | $W^{(2)}_{s_1 i_{1,1}+p_1, s_2 i_{1,2}, s_1 i_{1,1}+p_1, s_2 i_{1,2}, 1}$ |
| $i'_2$ | 4 | 5 |
| $i_{1,1}, i_{1,2}$ | $W^{(2)}_{s_1 i_{1,1}+2p_1, s_2 i_{1,2}, s_1 i_{1,1}+2p_1, s_2 i_{1,2}, 0}$ | $W^{(2)}_{s_1 i_{1,1}+2p_1, s_2 i_{1,2}, s_1 i_{1,1}+2p_1, s_2 i_{1,2}, 1}$ |
| $i'_2$ | 6 | 7 |
| $i_{1,1}, i_{1,2}$ | $W^{(2)}_{s_1 i_{1,1}+3p_1, s_2 i_{1,2}, s_1 i_{1,1}+3p_1, s_2 i_{1,2}, 0}$ | $W^{(2)}_{s_1 i_{1,1}+3p_1, s_2 i_{1,2}, s_1 i_{1,1}+3p_1, s_2 i_{1,2}, 1}$ |
| $i'_2$ | 8 | 9 |
| $i_{1,1}, i_{1,2}$ | $W^{(2)}_{s_1 i_{1,1}, s_2 i_{1,2}, s_1 i_{1,1}+p_1, s_2 i_{1,2}, 0}$ | $W^{(2)}_{s_1 i_{1,1}, s_2 i_{1,2}, s_1 i_{1,1}+p_1, s_2 i_{1,2}, 1}$ |
| $i'_2$ | 10 | 11 |
| $i_{1,1}, i_{1,2}$ | $W^{(2)}_{s_1 i_{1,1}+p_1, s_2 i_{1,2}, s_1 i_{1,1}+2p_1, s_2 i_{1,2}, 0}$ | $W^{(2)}_{s_1 i_{1,1}+p_1, s_2 i_{1,2}, s_1 i_{1,1}+2p_1, s_2 i_{1,2}, 1}$ |
| $i'_2$ | 12 | 13 |
| $i_{1,1}, i_{1,2}$ | $W^{(2)}_{s_1 i_{1,1}, s_2 i_{1,2}, s_1 i_{1,1}+3p_1, s_2 i_{1,2}, 0}$ | $W^{(2)}_{s_1 i_{1,1}, s_2 i_{1,2}, s_1 i_{1,1}+3p_1, s_2 i_{1,2}, 1}$ |
| $i'_2$ | 14 | 15 |
| $i_{1,1}, i_{1,2}$ | $W^{(2)}_{s_1 i_{1,1}+p_1, s_2 i_{1,2}, s_1 i_{1,1}+3p_1, s_2 i_{1,2}, 0}$ | $W^{(2)}_{s_1 i_{1,1}+p_1, s_2 i_{1,2}, s_1 i_{1,1}+3p_1, s_2 i_{1,2}, 1}$ |

TABLE 5B

| $i'_2$ | 16 | 17 |
|---|---|---|
| $i_{1,1}, i_{1,2}$ | $W^{(2)}_{s_1 i_{1,1}, s_2 i_{1,2}+p_2, s_1 i_{1,1}, s_2 i_{1,2}+p_2, 0}$ | $W^{(2)}_{s_1 i_{1,1}, s_2 i_{1,2}+p_2, s_1 i_{1,1}, s_2 i_{1,2}+p_2, 1}$ |
| $i'_2$ | 18 | 19 |
| $i_{1,1}, i_{1,2}$ | $W^{(2)}_{s_1 i_{1,1}+p_1, s_2 i_{1,2}+p_2, s_1 i_{1,1}+p_1, s_2 i_{1,2}+p_2, 0}$ | $W^{(2)}_{s_1 i_{1,1}+p_1, s_2 i_{1,2}+p_2, s_1 i_{1,1}+p_1, s_2 i_{1,2}+p_2, 1}$ |
| $i'_2$ | 20 | 21 |
| $i_{1,1}, i_{1,2}$ | $W^{(2)}_{s_1 i_{1,1}+3p_1, s_2 i_{1,2}+p_2, s_1 i_{1,1}+3p_1, s_2 i_{1,2}+p_2, 0}$ | $W^{(2)}_{s_1 i_{1,1}+3p_1, s_2 i_{1,2}+p_2, s_1 i_{1,1}+3p_1, s_2 i_{1,2}+p_2, 1}$ |
| $i'_2$ | 22 | 23 |
| $i_{1,1}, i_{1,2}$ | $W^{(2)}_{s_1 i_{1,1}, s_2 i_{1,2}+p_2, s_1 i_{1,1}+p_1, s_2 i_{1,2}+p_2, 0}$ | $W^{(2)}_{s_1 i_{1,1}, s_2 i_{1,2}+p_2, s_1 i_{1,1}+p_1, s_2 i_{1,2}+p_2, 1}$ |
| $i'_2$ | 24 | 25 |
| $i_{1,1}, i_{1,2}$ | $W^{(2)}_{s_1 i_{1,1}+p_1, s_2 i_{1,2}+p_2, s_1 i_{1,1}+2p_1, s_2 i_{1,2}+p_2, 0}$ | $W^{(2)}_{s_1 i_{1,1}+p_1, s_2 i_{1,2}+p_2, s_1 i_{1,1}+2p_1, s_2 i_{1,2}+p_2, 1}$ |
| $i'_2$ | 26 | 27 |
| $i_{1,1}, i_{1,2}$ | $W^{(2)}_{s_1 i_{1,1}+p_1, s_2 i_{1,2}+p_2, s_1 i_{1,1}+3p_1, s_2 i_{1,2}+p_2, 0}$ | $W^{(2)}_{s_1 i_{1,1}+p_1, s_2 i_{1,2}+p_2, s_1 i_{1,1}+3p_1, s_2 i_{1,2}+p_2, 1}$ |

TABLE 5B-continued

| $i'_2$ | 28 | 29 |
|---|---|---|
| $i_{1,1}, i_{1,2}$ | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ |
| $i'_2$ | 30 | 31 |
| $i_{1,1}, i_{1,2}$ | $W^{(2)}_{s_1 i_{1,1}+p_1, s_2 i_{1,2}, s_1 i_{1,1}+p_1, s_2 i_{1,2}+p_2, 0}$ | $W^{(2)}_{s_1 i_{1,1}+p_1, s_2 i_{1,2}, s_1 i_{1,1}+p_1, s_2 i_{1,2}+p_2, 1}$ |

In some embodiments, the rank-2 class A codebook is described in TABLE 4 and TABLES 5A and 5B, where $i_{1,1}=0,1,\ldots,O_1 N_1/s_1-1$, $i_{1,2}=0,1,\ldots,O_2 N_2/S_2-1$, and $p_1=1$ and $p_2=1$, and the pre-coder expression are given by:

Expression ($N_1 \geq N_2$), $$W^{(2)}_{m_1,m_2,m'_1,m'_2,n} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}$$

Expression ($N_1 < N_2$), $$W^{(2)}_{m_1,m_2,m'_1,m'_2,n} = \frac{1}{\sqrt{2Q}} \begin{bmatrix} v_{m_2} \otimes u_{m_1} & v_{m'_2} \otimes u_{m'_1} \\ \varphi_n v_{m_2} \otimes u_{m_1} & -\varphi_n v_{m'_2} \otimes u_{m'_1} \end{bmatrix}$$

Alternate expression ($N_1 \geq N_2$), $$W^{(2)}_{m_1,m_2,m'_1,m'_2,n} = \frac{1}{\sqrt{2Q}} \begin{bmatrix} w_{m_1,m_2} & w_{m'_1,m'_2} \\ \varphi_n w_{m_1,m_2} & -\varphi_n w_{m'_1,m'_2} \end{bmatrix}$$

Alternate expression ($N_1 < N_2$), $$W^{(2)}_{m_1,m_2,m'_1,m'_2,n} = \frac{1}{\sqrt{2Q}} \begin{bmatrix} w_{m_2,m_1} & w_{m'_2,m'_1} \\ \varphi_n w_{m_2,m_1} & -\varphi_n w_{m'_2,m'_1} \end{bmatrix}$$

In some embodiments, a second alternative design for Configuration 3 (described in TABLE 6 and TABLE 7) is also considered.

TABLE 6 shows a description of an alternative design for configuration 3 in rank-2 codebook. TABLE 7 shows a codebook table for alternative design for configuration 3 in rank02 codebook.

TABLE 6

Figure 16C:
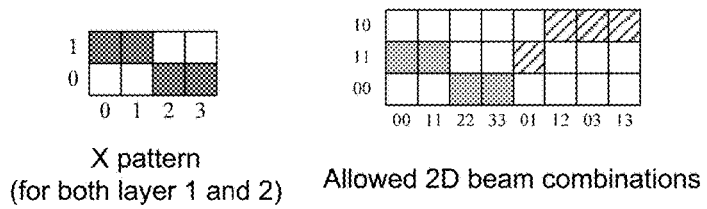
FIG. 16C depicts configurations for TABLE 6.

| Configuration Alternative Configuration 3 | | Selected $i'_2$ indices | $(s_1, s_2)$ |
|---|---|---|---|
| X pattern (for both layer 1 and 2) See FIG. 16C | Allowed 2D beam Combinations See FIG. 16C | 4-7, 16-27 | (2, 2) |

TABLE 7

| $i'_2$ | 0-19 | |
|---|---|---|
| $i_{1,1}, i_{1,2}$ | Same as Table 5 | |
| $i'_2$ | 20 | 21 |
| $i_{1,1}, i_{1,2}$ | $W^{(2)}_{s_1 i_{1,1}, s_2 i_{1,2}+p_2, s_1 i_{1,1}+3p_1, s_2 i_{1,2}, 0}$ | $W^{(2)}_{s_1 i_{1,1}, s_2 i_{1,2}+p_2, s_1 i_{1,1}+3p_1, s_2 i_{1,2}, 1}$ |
| $i'_2$ | 22 | 23 |
| $i_{1,1}, i_{1,2}$ | Same as Table 5 | Same as Table 5 |
| $i'_2$ | 24 | 25 |
| $i_{1,1}, i_{1,2}$ | $W^{(2)}_{s_1 i_{1,1}+p_1, s_2 i_{1,2}+p_2, s_1 i_{1,1}+2p_1, s_2 i_{1,2}, 0}$ | $W^{(2)}_{s_1 i_{1,1}+p_1, s_2 i_{1,2}+p_2, s_1 i_{1,1}+2p_1, s_2 i_{1,2}, 1}$ |
| $i'_2$ | 26 | 27 |
| $i_{1,1}, i_{1,2}$ | $W^{(2)}_{s_1 i_{1,1}+p_1, s_2 i_{1,2}+p_2, s_1 i_{1,1}+3p_1, s_2 i_{1,2}, 0}$ | $W^{(2)}_{s_1 i_{1,1}+p_1, s_2 i_{1,2}+p_2, s_1 i_{1,1}+3p_1, s_2 i_{1,2}, 1}$ |
| $i'_2$ | 28-31 | |
| $i_{1,1}, i_{1,2}$ | Same as Table 5 | |

Figure 9:
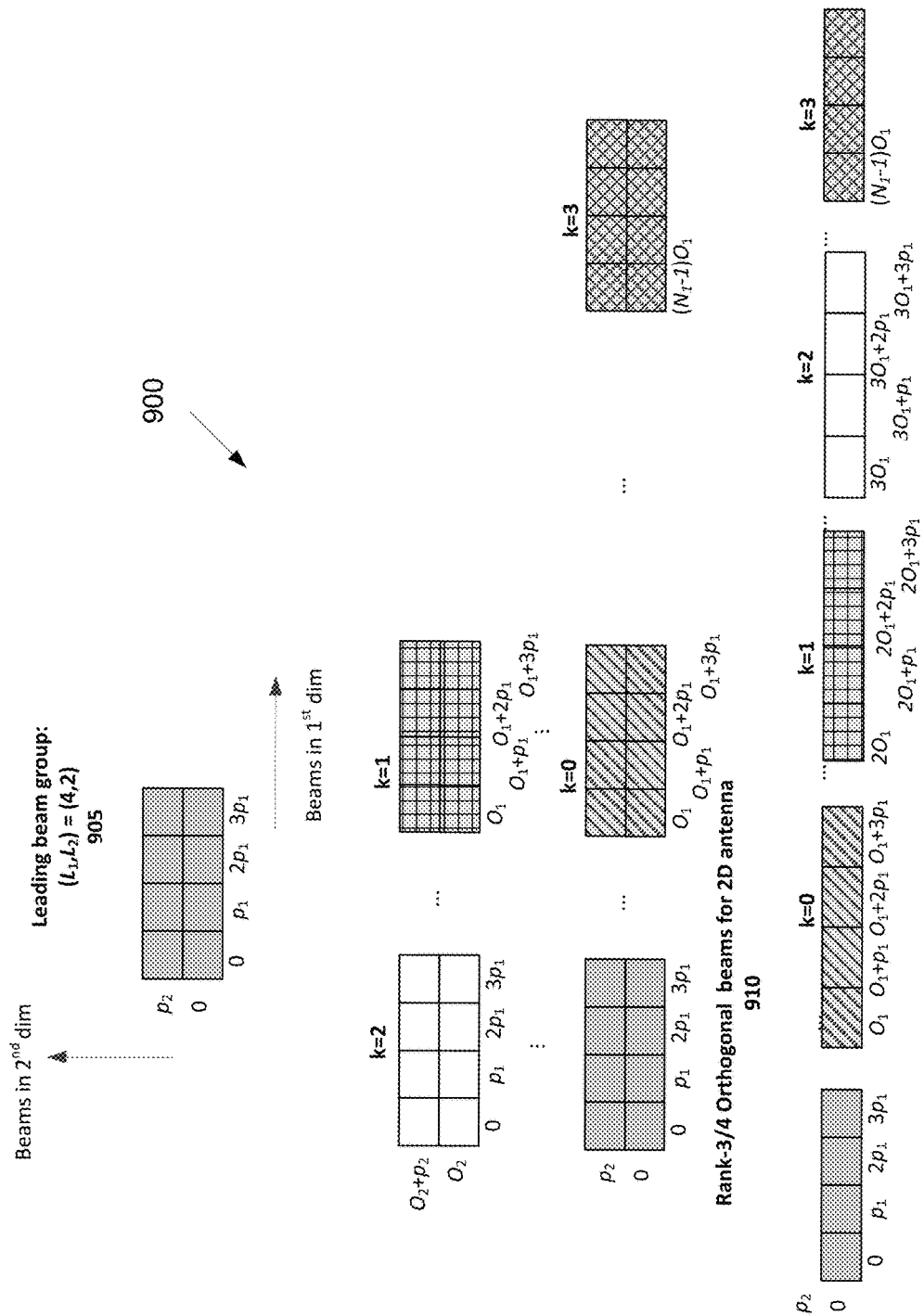
FIG. 9 illustrates an example rank 3-4 orthogonal beam pair construction according to embodiments of the present disclosure.

FIG. 9 illustrates an example rank 3-4 orthogonal beam pair construction 900 according to embodiments of the present disclosure. An embodiment of the rank 3-4 orthogonal beam pair construction 900 shown in FIG. 9 is for illustration only. Other embodiments may be used without departing from the scope of the present disclosure. As shown in FIG. 9, the rank 3-4 orthogonal beam pair construction 900 comprises a leading beam group 905, rank 3-4 orthogonal beams for 2D antenna 910, and rank 3-4 orthogonal beams for 1D antenna 915.

In some embodiments, for rank 3-4, the codebook for a given rank value is characterized by four parameters such as $\{i_{11}, i_{12}, k, i_2\}$. Different values of parameter k are used to construct different types of orthogonal beam groups for rank 3-4 codebook. An illustration of four orthogonal beam types, indexed by k=0, 1, 2, 3, is shown in FIG. 9 and a single rank 3-4 codebooks tables are constructed for all orthogonal beam types.

TABLE 10 and TABLE 11 show the rank 3-4 codebook tables that can be used for any of Q=8, 12, and 16 antenna port configurations, where $i_{1,1}=0,1,\ldots,O_1 N_1/s_1-1$; $i_{1,2}=0, 1,\ldots,O_2 N_2/s_2-1$; and k=0, 1, 2, 3; $\delta_1, \delta_2$ are selected from TABLE 10 depending on the k value.

The corresponding rank 3 pre-coder expression is given by:

Rank-3 expression ($N_1 \geq N_2$):

$$W^{(3)}_{m_1,m'_1,m_2,m'_2} = \frac{1}{\sqrt{3Q}} \begin{bmatrix} v_{m_1} \otimes u_{m_2} & v_{m_1} \otimes u_{m_2} & v_{m'_1} \otimes u_{m'_2} \\ v_{m_1} \otimes u_{m_2} & -v_{m_1} \otimes u_{m_2} & -v_{m'_1} \otimes u_{m'_2} \end{bmatrix}$$

$$\tilde{W}^{(3)}_{m_1,m'_1,m_2,m'_2} = \frac{1}{\sqrt{3Q}} \begin{bmatrix} v_{m_1} \otimes u_{m_2} & v_{m'_1} \otimes u_{m'_2} & v_{m'_1} \otimes u_{m'_2} \\ v_{m_1} \otimes u_{m_2} & v_{m'_1} \otimes u_{m'_2} & -v_{m'_1} \otimes u_{m'_2} \end{bmatrix}$$

Rank-3 expression ($N_1 < N_2$):

$$W^{(3)}_{m_1,m'_1,m_2,m'_2} = \frac{1}{\sqrt{3Q}} \begin{bmatrix} v_{m_2} \otimes u_{m_1} & v_{m_2} \otimes u_{m_1} & v_{m'_2} \otimes u_{m'_1} \\ v_{m_2} \otimes u_{m_1} & -v_{m_2} \otimes u_{m_1} & -v_{m'_2} \otimes u_{m'_1} \end{bmatrix}$$

$$\tilde{W}^{(3)}_{m_1,m'_1,m_2,m'_2} = \frac{1}{\sqrt{3Q}} \begin{bmatrix} v_{m_2} \otimes u_{m_1} & v_{m'_2} \otimes u_{m'_1} & v_{m'_2} \otimes u_{m'_1} \\ v_{m_2} \otimes u_{m_1} & v_{m'_2} \otimes u_{m'_1} & -v_{m'_2} \otimes u_{m'_1} \end{bmatrix};$$

Alternate rank-3 expression ($N_1 \geq N_2$):

$$W^{(3)}_{m_1,m'_1,m_2,m'_2} = \frac{1}{\sqrt{3Q}} \begin{bmatrix} w_{m_1,m_2} & w_{m_1,m_2} & w_{m'_1,m'_2} \\ w_{m_1,m_2} & -w_{m_1,m_2} & -w_{m'_1,m'_2} \end{bmatrix}$$

$$\tilde{W}^{(3)}_{m_1,m'_1,m_2,m'_2} = \frac{1}{\sqrt{3Q}} \begin{bmatrix} w_{m_1,m_2} & w_{m'_1,m'_2} & w_{m'_1,m'_2} \\ w_{m_1,m_2} & w_{m'_1,m'_2} & -w_{m'_1,m'_2} \end{bmatrix}$$

Alternate rank-3 expression ($N_1 < N_2$):

$$W^{(3)}_{m_1,m'_1,m_2,m'_2} = \frac{1}{\sqrt{3Q}} \begin{bmatrix} w_{m_2,m_1} & w_{m_2,m_1} & w_{m'_2,m'_1} \\ w_{m_2,m_1} & -w_{m_2,m_1} & -w_{m'_2,m'_1} \end{bmatrix}$$

$$\tilde{W}^{(3)}_{m_1,m'_1,m_2,m'_2} = \frac{1}{\sqrt{3Q}} \begin{bmatrix} w_{m_2,m_1} & w_{m'_2,m'_1} & w_{m'_2,m'_1} \\ w_{m_2,m_1} & w_{m'_2,m'_1} & -w_{m'_2,m'_1} \end{bmatrix}$$

The corresponding rank 4 pre-coder expression is given by:

Rank-4 expression ($N_1 \geq N_2$):

$$W^{(3)}_{m_1,m'_1,m_2,m'_2,n} = \frac{1}{\sqrt{4Q}} \begin{bmatrix} v_{m_1} \otimes u_{m_2} & v_{m'_1} \otimes u_{m'_2} & v_{m_1} \otimes u_{m_2} & v_{m'_1} \otimes u_{m'_2} \\ \varphi_n v_{m_1} \otimes u_{m_2} & \varphi_n v_{m'_1} \otimes u_{m'_2} & -\varphi_n v_{m_1} \otimes u_{m_2} & -\varphi_n v_{m'_1} \otimes u_{m'_2} \end{bmatrix}$$

Rank-4 expression ($N_1 \leq N_2$):

$$W^{(3)}_{m_1,m'_1,m_2,m'_2,n} = \frac{1}{\sqrt{4Q}} \begin{bmatrix} v_{m_2} \otimes u_{m_1} & v_{m'_2} \otimes u_{m'_1} & v_{m_2} \otimes u_{m_1} & v_{m'_2} \otimes u_{m'_1} \\ \varphi_n v_{m_2} \otimes u_{m_1} & \varphi_n v_{m'_2} \otimes u_{m'_1} & -\varphi_n v_{m_2} \otimes u_{m_1} & -\varphi_n v_{m'_2} \otimes u_{m'_1} \end{bmatrix}$$

Alternate rank-4 expression ($N_1 \geq N_2$):

$$W^{(3)}_{m_1,m'_1,m_2,m'_2,n} = \frac{1}{\sqrt{3Q}} \begin{bmatrix} w_{m_1,m_2} & w_{m'_1,m'_2} & w_{m_1,m_2} & w_{m'_1,m'_2} \\ \varphi_n w_{m_1,m_2} & \varphi_n w_{m'_1,m'_2} & -\varphi_n w_{m_1,m_2} & -\varphi_n w_{m'_1,m'_2} \end{bmatrix}$$

Alternate rank-3 expression ($N_1 < N_2$):

$$W^{(3)}_{m_1,m'_1,m_2,m'_2,n} = \frac{1}{\sqrt{3Q}} \begin{bmatrix} w_{m_2,m_1} & w_{m'_2,m'_1} & w_{m_2,m_1} & w_{m'_2,m'_1} \\ \varphi_n w_{m_2,m_1} & \varphi_n w_{m'_2,m'_1} & -\varphi_n w_{m_2,m_1} & -\varphi_n w_{m'_2,m'_1} \end{bmatrix}$$

TABLE 8 shows orthogonal beam type to $(\delta_1, \delta_2)$ mapping and TABLE 9 shows an alternate orthogonal beam type to $(\delta_1, \delta_2)$ mapping.

TABLE 8

| | | k | | | |
|---|---|---|---|---|---|
| | $\delta$ | 0 | 1 | 2 | 3 |
| If $N_1 > 1$ and $N_2 > 1$ | $\delta_1$ | $O_1$ | 0 | $O_1$ | $(N_1-1)O_1$ |
| | $\delta_2$ | 0 | $O_2$ | $O_2$ | 0 |
| If $N_2 = 1$ | $\delta_1$ | $O_1$ | $2O_1$ | $3O_1$ | $(N_1-1)O_1$ |
| | $\delta_2$ | 0 | 0 | 0 | 0 |

TABLE 9

| | | k | | | | | | | |
|---|---|---|---|---|---|---|---|---|---|
| | $\delta$ | 0 | 1 | 2 | 3 | 4 | 5 | 6 | 7 |
| If $N_1 > 1$ and $N_2 > 1$ | $\delta_1$ | $O_1$ | 0 | $O_1$ | $2O_1$ | 0 | $O_1$ | $2O_1$ | $2O_1$ |
| | $\delta_2$ | 0 | $O_2$ | $O_2$ | 0 | $2O_2$ | $2O_2$ | $O_2$ | $2O_2$ |
| If $N_2 = 1$ | $\delta_1$ | $O_1$ | $2O_1$ | $3O_1$ | | | | | |
| | $\delta_2$ | 0 | 0 | 0 | | | | | |

TABLE 10 shows a codebook for 3 layers CSI reporting and TABLE 11 shows a codebook for 4 layers CSI reporting.

TABLE 10

| $i'_2$ | 0 | 1 |
|---|---|---|
| $i_{1,1}, i_{1,2}, k$ | $W_{s_1i_{1,1}, s_1i_{1,1}+\delta_1, s_2i_{1,2}, s_2i_{1,2}+\delta_2}^{(3)}$ | $W_{s_1i_{1,1}+\delta_1, s_1i_{1,1}, s_2i_{1,2}+\delta_2, s_2i_{1,2}}^{(3)}$ |
| $i'_2$ | 2 | 3 |
| $i_{1,1}, i_{1,2}, k$ | $\tilde{W}_{s_1i_{1,1}, s_1i_{1,1}+\delta_1, s_2i_{1,2}, s_2i_{1,2}+\delta_2}^{(3)}$ | $\tilde{W}_{s_1i_{1,1}+\delta_1, s_1i_{1,1}, s_2i_{1,2}+\delta_2, s_2i_{1,2}}^{(3)}$ |
| $i'_2$ | 4 | 5 |
| $i_{1,1}, i_{1,2}, k$ | $W_{s_1i_{1,1}+p_1, s_1i_{1,1}+p_1+\delta_1, s_2i_{1,2}, s_2i_{1,2}+\delta_2}^{(3)}$ | $W_{s_1i_{1,1}+p_1+\delta_1, s_1i_{1,1}+p_1, s_2i_{1,2}+\delta_2, s_2i_{1,2}}^{(3)}$ |
| $i'_2$ | 6 | 7 |
| $i_{1,1}, i_{1,2}, k$ | $\tilde{W}_{s_1i_{1,1}+p_1, s_1i_{1,1}+p_1+\delta_1, s_2i_{1,2}, s_2i_{1,2}+\delta_2}^{(3)}$ | $\tilde{W}_{s_1i_{1,1}+p_1+\delta_1, s_1i_{1,1}+p_1, s_2i_{1,2}+\delta_2, s_2i_{1,2}}^{(3)}$ |
| $i'_2$ | 8 | 9 |
| $i_{1,1}, i_{1,2}, k$ | $W_{s_1i_{1,1}+2p_1, s_1i_{1,1}+2p_1+\delta_1, s_2i_{1,2}, s_2i_{1,2}+\delta_2}^{(3)}$ | $W_{s_1i_{1,1}+2p_1+\delta_1, s_1i_{1,1}+2p_1, s_2i_{1,2}+\delta_2, s_2i_{1,2}}^{(3)}$ |
| $i'_2$ | 10 | 11 |
| $i_{1,1}, i_{1,2}, k$ | $\tilde{W}_{s_1i_{1,1}+2p_1, s_1i_{1,1}+2p_1+\delta_1, s_2i_{1,2}, s_2i_{1,2}+\delta_2}^{(3)}$ | $\tilde{W}_{s_1i_{1,1}+2p_1+\delta_1, s_1i_{1,1}+2p_1, s_2i_{1,2}+\delta_2, s_2i_{1,2}}^{(3)}$ |
| $i'_2$ | 12 | 13 |
| $i_{1,1}, i_{1,2}, k$ | $W_{s_1i_{1,1}+3p_1, s_1i_{1,1}+3p_1+\delta_1, s_2i_{1,2}, s_2i_{1,2}+\delta_2}^{(3)}$ | $W_{s_1i_{1,1}+3p_1+\delta_1, s_1i_{1,1}+3p_1, s_2i_{1,2}+\delta_2, s_2i_{1,2}}^{(3)}$ |
| $i'_2$ | 14 | 15 |
| $i_{1,1}, i_{1,2}, k$ | $\tilde{W}_{s_1i_{1,1}+3p_1, s_1i_{1,1}+3p_1+\delta_1, s_2i_{1,2}, s_2i_{1,2}+\delta_2}^{(3)}$ | $\tilde{W}_{s_1i_{1,1}+3p_1+\delta_1, s_1i_{1,1}+3p_1, s_2i_{1,2}+\delta_2, s_2i_{1,2}}^{(3)}$ |
| $i'_2$ | \multicolumn{2}{c}{16-31} ||
| $i_{1,1}, i_{1,2}, k$ | \multicolumn{2}{c}{Entries 16-31 constructed with replacing $s_2i_{1,2}$ in third and fourth subscripts with $s_2i_{1,2} + p_2$ in entries 0-15.} ||

TABLE 11

| $i'_2$ | 0 | 1 |
|---|---|---|
| $i_{1,1}, i_{1,2}, k$ | $W_{s_1i_{1,1}, s_1i_{1,1}+\delta_1, s_2i_{1,2}, s_2i_{1,2}+\delta_2, 0}^{(4)}$ | $W_{s_1i_{1,1}, s_1i_{1,1}+\delta_1, s_2i_{1,2}, s_2i_{1,2}+\delta_2, 1}^{(4)}$ |
| $i'_2$ | 2 | 3 |
| $i_{1,1}, i_{1,2}, k$ | $W_{s_1i_{1,1}+p_1, s_1i_{1,1}+p_1+\delta_1, s_2i_{1,2}, s_2i_{1,2}+\delta_2, 0}^{(4)}$ | $W_{s_1i_{1,1}+p_1, s_1i_{1,1}+p_1+\delta_1, s_2i_{1,2}, s_2i_{1,2}+\delta_2, 1}^{(4)}$ |
| $i'_2$ | 4 | 5 |
| $i_{1,1}, i_{1,2}, k$ | $W_{s_1i_{1,1}+2p_1, s_1i_{1,1}+2p_1+\delta_1, s_2i_{1,2}, s_2i_{1,2}+\delta_2, 0}^{(4)}$ | $W_{s_1i_{1,1}+2p_1, s_1i_{1,1}+2p_1+\delta_1, s_2i_{1,2}, s_2i_{1,2}+\delta_2, 1}^{(4)}$ |
| $i'_2$ | 6 | 7 |
| $i_{1,1}, i_{1,2}, k$ | $W_{s_1i_{1,1}+3p_1, s_1i_{1,1}+3p_1+\delta_1, s_2i_{1,2}, s_2i_{1,2}+\delta_2, 0}^{(4)}$ | $W_{s_1i_{1,1}+3p_1, s_1i_{1,1}+3p_1+\delta_1, s_2i_{1,2}, s_2i_{1,2}+\delta_2, 1}^{(4)}$ |
| $i'_2$ | \multicolumn{2}{c}{8-15} ||
| $i_{1,1}, i_{1,2}, k$ | \multicolumn{2}{c}{Entries 8-15 constructed with replacing $s_2i_{1,2}$ in third and fourth subscripts with $s_2i_{1,2} + p_2$ in entries 0-7.} ||

Figure 10:
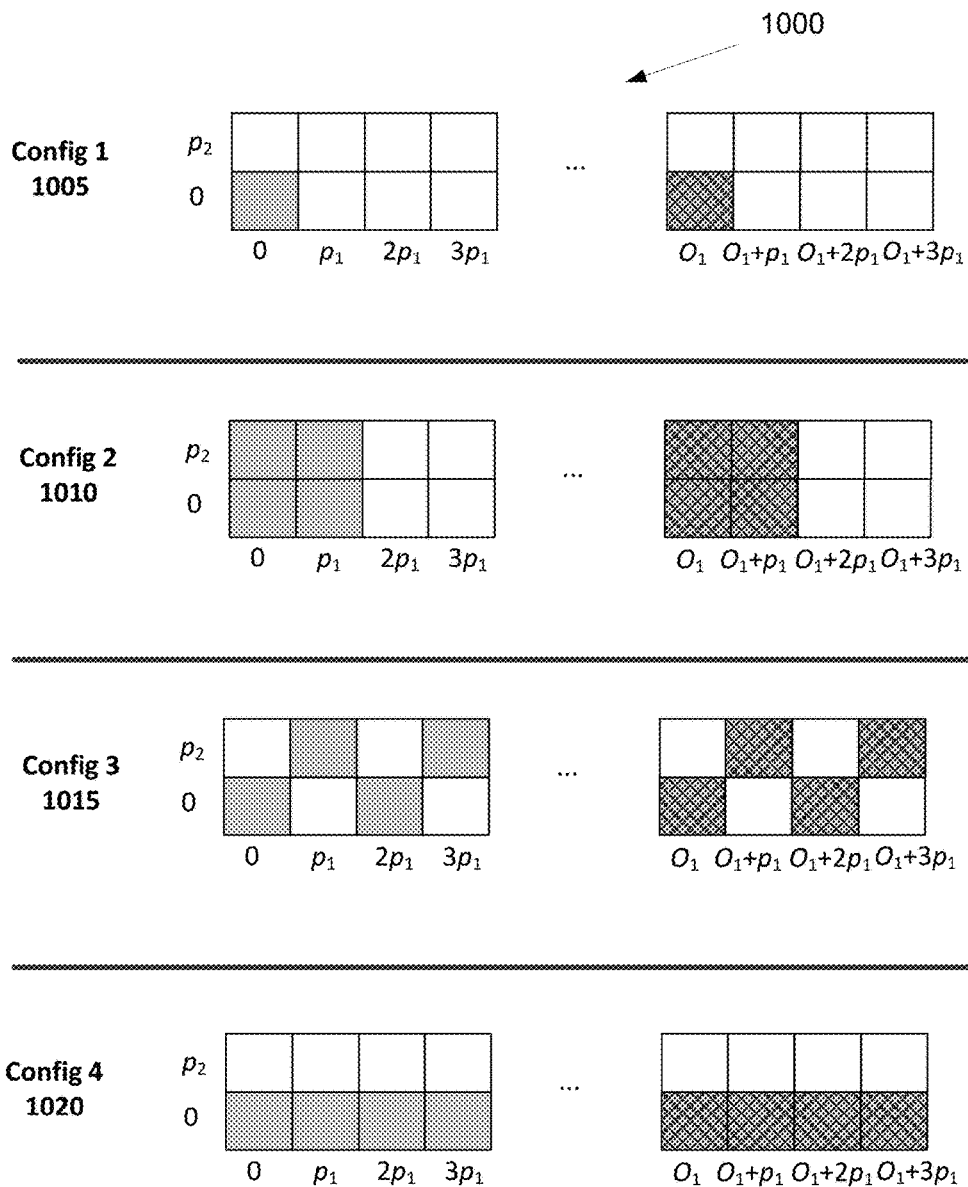
FIG. 10 illustrates an example orthogonal beams for rank 3-4 according to embodiments of the present disclosure.

FIG. 10 illustrates an example orthogonal beam 1000 or rank 3-4 according to embodiments of the present disclosure. An embodiment of the orthogonal beam 1000 for rank 3-4 shown in FIG. 10 is for illustration only. Other embodiments may be used without departing from the scope of the present disclosure. As shown in FIG. 10, the orthogonal beam 1000 for rank 3-4 comprises a configuration 1 1005, a configuration 2 1010, a configuration 3 1015, and a configuration 4 1020.

In some embodiments, a UE is configured with a beam group configuration from four configurations, namely the configuration 1 1005, the configuration 2 1010, the configuration 3 1015, and the configuration 4 1020, for codebook subset selection on mater rank 3-4 codebooks. For k=0, an illustration of the four configurations is shown FIG. 10. Depending on the configuration, the UE selects $i'_2$ indices (in TABLE 10 and TABLE 11) according to TABLE 12 and TABLE 13 for rank 3 and rank 4, respectively, for PMI reporting. The parameters $(s_1, s_2)$ and $(p_1, p_2)$ for the four configurations are shown in TABLE 12 and TABLE 13.

TABLE 12 shows selected $i'_2$ indices for rank-3 CSI reporting and TABLE 13 shows selected $i'_2$ indices for rank-4 CSI reporting.

TABLE 12

| Configuration | Selected $i_2'$ indices | (s1, s2) | $(p_1, p_2)$ |
|---|---|---|---|
| 1 | 0, 2 | (1, 1) | (—, —) |
| 2 | 0-7, 16-23 | $(O_1, O_2)$ | $\left(\frac{O_1}{2}, \frac{O_2}{2}\right)$ |
| 3 | 0-3, 8-11, 20-23, 28-31 | $(O_1, O_2)$ | $\left(\frac{O_1}{4}, \frac{O_2}{4}\right)$ |
| 4 | 0-15 | $\left(O_1, \frac{O_2}{2}\right)$ | $\left(\frac{O_1}{4}, -\right)$ |

TABLE 13

| Configuration | Selected $i_2'$ indices | (s1, s2) | $(p_1, p_2)$ |
|---|---|---|---|
| 1 | 0, 1 | (1, 1) | (—, —) |
| 2 | 0-3, 8-11 | $(O_1, O_2)$ | $\left(\frac{O_1}{2}, \frac{O_2}{2}\right)$ |
| 3 | 0-1, 4-5, 10-11, 14-15 | $(O_1, O_2)$ | $\left(\frac{O_1}{4}, \frac{O_2}{2}\right)$ |
| 4 | 0-7 | $\left(O_1, \frac{O_2}{2}\right)$ | $\left(\frac{O_1}{4}, -\right)$ |

Note that $p_1=s_1/L_1$ for the configurations 2-4, where $L_1$ is the number of included beam indices along the first dimension of the master codebook. In other words, for the configurations 2-4, the effective oversampling is kept fixed for rank 3-4.

In some embodiments, a UE is configured with a second alternative design for a configuration 3 in rank 3-4 codebook, which is described in TABLE 14. TABLE 14 shows a description of alternative design for the configuration 3 in rank 3-4 codebook.

TABLE 14

Figure 16D:
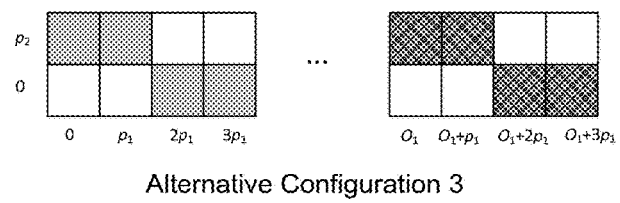
FIG. 16D depicts configurations for TABLE 14.

| Alternative Configuration 3 | Rank-3 selected $i'_2$ indices (TABLE 10) | Rank-4 selected $i'_2$ indices (TABLE 11) | $(s_1, s_2)$ | $(p_1, p_2)$ |
|---|---|---|---|---|
| See FIG. 16D | 8-23 | 4-11 | $(O_1, O_2)$ | $\left(\frac{O_1}{4}, \frac{O_2}{2}\right)$ |

In some embodiments, a UE feeds back k in PMI as part of W1 indication. In particular, k is jointly encoded with $i_1$ indication(s) or $(i_1, i_2)$ indication. In some embodiments, a UE is configured with a k value. In some embodiments, there are two alternatives for the number of values of k. In one example, two values: k=0, 1 as shown in TABLE 9. In another example, maximum eight values are determined if $N_1>1$ and $N_2>1$: k=0, 1, 2 . . . , 7 as shown in TABLE 9. In yet another example, maximum eight values are determined if $N_2=1$: k=0, 1, 2 as shown in TABLE 9. In such example, a UE may be configured with at least one of examples.

In some embodiments, a UE is configured with rank 3-4 codebook tables as shown in TABLE 10 and TABLE 11 with $(s_1, s_2)$ and $(p_1, p_2)$ parameters according to TABLE 15. In one example, TABLE 15 may be applicable to oversampling factors $O_1, O_2=4, 8, 16$, etc. In another example, TABLE 15 may be applicable to a number of antenna ports Q=8, 12, 16, etc.

Note that TABLE 15 is for $N_1 \geq N_2$ case. For $N_1 < N_2$, the parameter table is obtained by swapping the dimension indices (1, 2) with (2, 1) in TABLE 15.

TABLE 15

| Antenna port configuration | Configuration | $(s_1, s_2)$ | $(p_1, p_2)$ |
|---|---|---|---|
| If $N_1 > 1$ and $N_2 > 1$ | 1 | (1, 1) | (-, -) |
| | 2 | $\left(\frac{O_1}{2}, \frac{O_2}{2}\right)$ | $\left(\frac{O_1}{4}, \frac{O_2}{4}\right)$ |
| | 3 | $\left(O_1, \frac{O_2}{2}\right)$ | $\left(\frac{O_1}{4}, \frac{O_2}{2}\right)$ |
| | 4 | $\left(O_1, \frac{O_2}{4}\right)$ | $\left(\frac{O_1}{4}, -\right)$ |
| $N_2 = 1$ | 4 | $(O_1, -)$ | $\left(\frac{O_1}{4}, -\right)$ |

The motivation behind this choice of parameters is to ave the same effective oversampling factor for configuration=2, 3, 4. For instance, an effective oversampling factor for the parameters in TABLE 15 is (4, 4), which is the same as the effective oversampling factor in LTE specification codebook. As an example, if $O_1, O_2$, then corresponding beam indices are 0, 2, 4, 6, etc. in the two dimensions. In one example for configuration 2, in both dimensions, beams (0, 2) form one beam group, beams (4, 6) form the next beam group, and so on. In another example for configuration 3, in 1st dimension, beams (0, 2, 4, 6) form one beam group, beams (8, 10, 12, 14) form the next beam group, and so on, and in 2nd dimension, beams (0, 2) form one beam group, beams (4, 6) form the next beam group, and so on. In yet another example for configuration 4, in 1st dimension, beams (0, 2, 4, 6) form one beam group, beams (8, 10, 12, 14) form the next beam group, and so on, and in 2nd dimension, beam 0 forms one beam group, beam 2 forms the next beam group, and so on. Note that the effective oversampling factor is maintained at $(O_1, O_2)$ for configuration 1.

In some embodiments, a UE is configured with rank 3-4 codebook tables as shown in TABLE 10 and TABLE 11 with $(s_1, s_2)$ and $(p_1, p_2)$ parameters according to TABLE 16, which corresponds to effective oversampling factors the same as the configured oversampling factors. TABLE 16 shows $(s_1, s_2)$ and $(p_1, p_2)$ parameters for rank 3-4 codebook for $N_1 \geq N_2$.

TABLE 16

| Antenna port configuration | Configuration | $(s_1, s_2)$ | $(p_1, p_2)$ |
|---|---|---|---|
| If $N_1 > 1$ and $N_2 > 1$ | 1 | (1, 1) | (—, —) |
| | 2 | (2, 2) | (1, 1) |
| | 3 | (4, 2) | |
| | 4 | (4, 1) | |
| $N_2 = 1$ | 4 | (4, —) | (1, —) |

In some embodiments, a UE is configured with rank 3-4 codebook tables in TABLE 10 and 11 with $(s_1, s_2)$ and $(p_1, p_2)$ parameters the same as in the rank 1-2 codebook. In this case, the parameters are given by TABLE 17. TABLE 17 shows $(s_1, s_2)$ and $(p_1, p_2)$ parameters for rank 3-4 codebook for $N_1 \geq N_2$.

TABLE 17

| Antenna port configuration | Configuration | $(s_1, s_2)$ | $(p_1, p_2)$ |
|---|---|---|---|
| If $N_1 > 1$ and $N_2 > 1$ | 1 | (1, 1) | (—, —) |
|  | 2-4 | (2, 2) | (1, 1) |
| $N_2 = 1$ | 4 | (2, —) | (1, —) |

In some embodiments, for rank 5-8, the proposed codebooks are characterized by two parameters such as $\{i_{11}, i_{12}\}$. Consequently, only W1 feedback applies. For rank 5, 6, 7, 8, the precoding matrices are as in the following, where $\delta_{1,1}$, $\delta_{1,2}$, $\delta_{1,3}$, $\beta_{2,1}$, $\delta_{2,2}$, $\delta_{2,3}$ are determined by the RRC 'Config' parameter that can take values 1, 2, 3, 4.

Rank-5 expression ($N_1 \geq N_2$), $$W^{(5)}_{i_{1,1}, i_{1,2}} = \frac{1}{\sqrt{5Q}} \begin{bmatrix} m1 & m1 & m3 & m3 & m5 \\ m1 & m2 & m3 & m4 & m5 \end{bmatrix},$$

where $m1 = v_{s_1 i_{1,2}} \otimes u_{s_2 i_{1,2}}$, $m2 = v_{s_1 i_{1,1}} \otimes u_{s_2 i_{1,2}}$, $m3 = v_{s_1 i_{1,1} + \delta_{1,1}} \otimes u_{s_2 i_{1,2} + \delta_{2,1}}$, $m4 = -v_{s_1 i_{1,1} + \delta_{1,1}} \otimes u_{s_2 i_{1,2} + \delta_{2,1}}$, and $m5 = v_{s_1 i_{1,1} + \delta_{1,2}} \otimes u_{s_2 i_{1,2} + \delta_{2,2}}$.

Rank-5 expression ($N_1 < N_2$), $$W^{(5)}_{i_{1,1}, i_{1,2}} = \frac{1}{\sqrt{5Q}} \begin{bmatrix} m6 & m6 & m8 & m8 & m10 \\ m6 & m7 & m8 & m9 & m10 \end{bmatrix},$$

where $m6 = v_{s_2 i_{1,2}} \otimes u_{s_1 i_{1,1}}$, $m7 = v_{s_2 i_{1,2}} \otimes u_{s_1 i_{1,1}}$, $m8 = v_{s_2 i_{1,2} + \delta_{2,1}} \otimes u_{s_1 i_{1,1} + \delta_{1,1}}$, $m9 = v_{s_2 i_{1,2} + \delta_{2,1}} \otimes u_{s_1 i_{1,1} + \delta_{1,1}}$, and $m10 = v_{s_2 i_{1,2} + \delta_{2,2}} \otimes u_{s_1 i_{1,1} + \delta_{1,2}}$.

Rank-6 expression ($N_1 \geq N_2$), $$W^{(6)}_{i_{1,1}, i_{1,2}} = \frac{1}{\sqrt{6Q}} \begin{bmatrix} m1 & m1 & m3 & m3 & m5 & m5 \\ m1 & m2 & m3 & m4 & m5 & m11 \end{bmatrix},$$

where $m11 = v_{s_1 i_{1,1} + \delta_{1,2}} \otimes u_{s_2 i_{1,2} + \delta_{2,2}}$.

Rank-6 expression ($N_1 \leq N_2$), $$W^{(6)}_{i_{1,1}, i_{1,2}} = \frac{1}{\sqrt{6Q}} \begin{bmatrix} m6 & m6 & m8 & m8 & m10 & m10 \\ m6 & m7 & m8 & m9 & m10 & m12 \end{bmatrix},$$

where $m12 = v_{s_2 i_{1,2} + \delta_{2,2}} \otimes u_{s_1 i_{1,1} + \delta_{1,2}}$.

Rank-7 expression ($N_1 \geq N_2$), $$W^{(7)}_{i_{1,1}, i_{1,2}} = \frac{1}{\sqrt{7Q}} \begin{bmatrix} m1 & m1 & m3 & m3 & m5 & m5 & m13 \\ m1 & m2 & m3 & m4 & m5 & m11 & m13 \end{bmatrix},$$

where $m13 = v_{s_1 i_{1,1} + \delta_{1,3}} \otimes u_{s_2 i_{1,1} + \delta_{2,3}}$.

Rank-7 expression ($N_1 < N_2$), $$W^{(7)}_{i_{1,1}, i_{1,2}} = \frac{1}{\sqrt{7Q}} \begin{bmatrix} m6 & m6 & m8 & m8 & m10 & m10 & m14 \\ m6 & m7 & m8 & m9 & m10 & m12 & m14 \end{bmatrix},$$

where $m14 = v_{s_2 i_{1,2} + \delta_{2,3}} \otimes u_{s_1 i_{1,1} + \delta_{1,3}}$.

Rank-8 expression ($N_1 \geq N_2$), $$W^{(8)}_{i_{1,1}, i_{1,2}} = \frac{1}{\sqrt{8Q}} \begin{bmatrix} m1 & m1 & m3 & m3 & m5 & m5 & m15 & m15 \\ m1 & m2 & m3 & m4 & m5 & m11 & m15 & m13 \end{bmatrix},$$

where $m15 = v_{s_1 i_{1,1} + \delta_{1,3}} \otimes u_{s_2 i_{1,2} + \delta_{2,3}}$.

Rank-8 expression ($N_1 < N_2$), $$W^{(8)}_{i_{1,1}, i_{1,2}} = \frac{1}{\sqrt{8Q}} \begin{bmatrix} m6 & m6 & m8 & m8 & m10 & m10 & m14 & m14 \\ m6 & m7 & m8 & m9 & m10 & m12 & m14 & m16 \end{bmatrix},$$

where $m16 = v_{s_2 i_{1,2} + \delta_{2,3}} \otimes u_{s_1 i_{1,1} + \delta_{1,3}}$.

Alternate rank-5 expression ($N_1 \geq N_2$), $$W^{(5)}_{i_{1,1}, i_{1,2}} = \frac{1}{\sqrt{5Q}} \begin{bmatrix} n1 & n1 & n3 & n3 & n5 \\ n1 & n2 & n3 & n4 & n5 \end{bmatrix},$$

where $n1 = w_{s_1 i_{1,1}, s_2 i_{1,2}}$, $n2 = w_{s_1 i_{1,1}, s_2 i_{1,2}}$, $n3 = w_{s_1 i_{1,1} + \delta_{1,1}, s_2 i_{1,2} + \delta_{2,1}}$, $n4 = -w_{s_1 i_{1,1} + \delta_{1,1}, s_2 i_{1,2} + \delta_{2,1}}$, and $n5 = v_{s_1 i_{1,1} + \delta_{1,2}, s_2 i_{1,2} + \delta_{2,2}}$.

Alternate rank-6 expression ($N_1 < N_2$), $$W^{(5)}_{i_{1,1}, i_{1,2}} = \frac{1}{\sqrt{5Q}} \begin{bmatrix} n6 & n6 & n8 & n8 & n10 \\ n6 & n7 & n8 & n9 & n10 \end{bmatrix},$$

where $n6 = w_{s_2 i_{1,2}, s_1 i_{1,1}}$, $n7 = -w_{s_2 i_{1,2}, s_1 i_{1,1}}$, $n8 = w_{s_2 i_{1,2} + \delta_{2,1}, s_1 i_{1,1} + \delta_{1,1}}$, $n9 = w_{s_2 i_{1,2} + \delta_{2,1}, s_1 i_{1,1} + \delta_{1,1}}$, and $n10 = v_{s_2 i_{1,2} + \delta_{2,2}, s_1 i_{1,1} + \delta_{1,2}}$.

Alternate rank-6 expression ($N_1 \geq N_2$), $$W^{(6)}_{i_{1,1}, i_{1,2}} = \frac{1}{\sqrt{6Q}} \begin{bmatrix} n1 & n1 & n3 & n3 & n5 & n5 \\ n1 & n2 & n3 & n4 & n5 & n11 \end{bmatrix},$$

where $n11 = w_{s_1 i_{1,1} + \delta_{1,2}, s_2 i_{1,2} + \delta_{2,2}}$.

Alternate rank-2 expression ($N_1 < N_2$), $$W^{(6)}_{i_{1,1}, i_{1,2}} = \frac{1}{\sqrt{6Q}} \begin{bmatrix} n6 & n6 & n8 & n8 & n10 & n10 \\ n6 & n7 & n8 & n9 & n10 & n12 \end{bmatrix},$$

where $n12 = w_{s_2 i_{1,2} + \delta_{2,2}, s_1 i_{1,1} + \delta_{1,2}}$.

Alternate rank-7 expression ($N_1 \geq N_2$), $$W^{(7)}_{i_{1,1}, i_{1,2}} = \frac{1}{\sqrt{7Q}} \begin{bmatrix} n1 & n1 & n3 & n3 & n5 & n5 & n13 \\ n1 & n2 & n3 & n4 & n5 & n11 & n13 \end{bmatrix},$$

where $n13 = w_{s_1 i_{1,3} + \delta_{1,3}, s_2 i_{1,1} + \delta_{2,3}}$.

Alternate rank-7 expression ($N_1 < N_2$), $$W^{(7)}_{i_{1,1}, i_{1,2}} = \frac{1}{\sqrt{7Q}} \begin{bmatrix} n6 & n6 & n8 & n8 & n10 & n10 & n14 \\ n6 & n7 & n8 & n9 & n10 & n12 & n14 \end{bmatrix},$$

where $n14 = w_{s_2 i_{1,2} + \delta_{2,3}, s_1 i_{1,1} + \delta_{1,3}}$.

Alternate rank-8 expression ($N_1 \geq N_2$), $$W^{(8)}_{i_{1,1},i_{1,2}} = \frac{1}{\sqrt{8Q}}\begin{bmatrix} n1 & n1 & n3 & n3 & n5 & n5 & n13 & n13 \\ n1 & n2 & n3 & n4 & n5 & n11 & n13 & n15 \end{bmatrix},$$

where $n15 = -w_{s_1 i_{1,1}+\delta_{1,3}, s_2 i_{1,2}+\delta_{2,3}}$.

Alternate rank-8 expression ($N_1 < N_2$), $$W^{(8)}_{i_{1,1},i_{1,2}} = \frac{1}{\sqrt{8Q}}\begin{bmatrix} n6 & n6 & n8 & n8 & n10 & n10 & n14 & n14 \\ n6 & n7 & n8 & n9 & n10 & n12 & n14 & n16 \end{bmatrix}.$$

Figure 11:
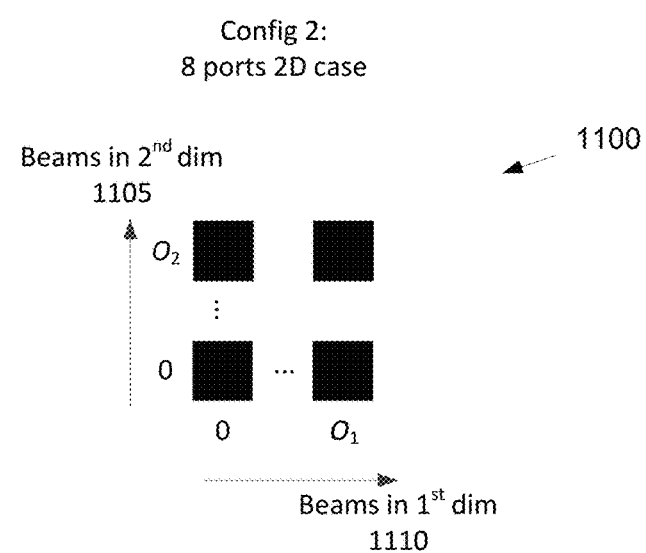
FIG. 11 illustrates an example orthogonal beam grouping for rank 5-8 according to embodiments of the present disclosure.

FIG. 11 illustrates an example orthogonal beam grouping 1100 for rank 5-8 according to embodiments of the present disclosure. An embodiment of the orthogonal beam grouping 1100 for rank 5-8 shown in FIG. 11 is for illustration only. Other embodiments may be used without departing from the scope of the present disclosure. As shown in FIG. 11, the orthogonal beam grouping 1100 comprises beams in the second dim 1105 and beams in the first dim 1110.

In some embodiments, as shown in FIG. 11, for 8 ports 2D case, there is only one orthogonal beam type which corresponds to Config=2 for rank 5-8 codebook, and is parameterized by $\delta_{1,1}$, $\delta_{1,2}$, $\delta_{1,3}$, $\delta_{2,1}$, $\delta_{2,2}$, $\delta_{2,3}$ values given in TABLE 18. In this case, the UE always maps the configuration parameter to configuration (e.g., config)=2 as shown in FIG. 11, regardless of the value of the "Config" parameter. TABLE 18 shoes delta values for 8-port rank 5-8 codebooks.

TABLE 18

| Antenna configuration | | $\delta_{1,1}$ | $\delta_{1,2}$ | $\delta_{1,3}$ | $\delta_{2,1}$ | $\delta_{2,2}$ | $\delta_{2,3}$ |
|---|---|---|---|---|---|---|---|
| Configuration = 2 | (2, 2) | $O_1$ | 0 | $O_1$ | $O_2$ | 0 | $O_2$ |

Figure 12:
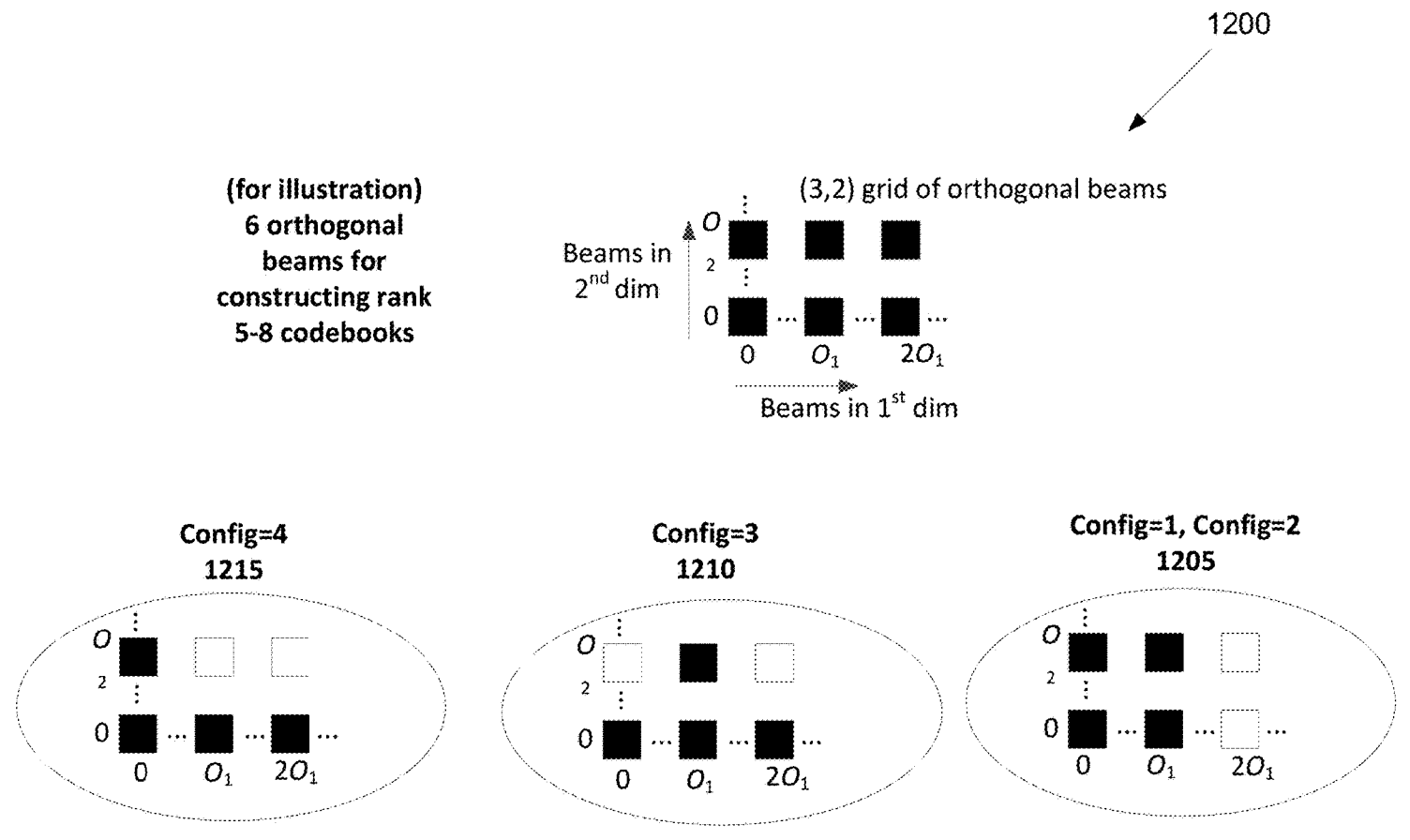

FIG. 12 illustrates another example orthogonal beam grouping 1200 for rank 5-8 according to embodiments of the present disclosure. An embodiment of the orthogonal beam grouping 1200 for rank 5-8 shown in FIG. 12 is for illustration only. Other embodiments may be used without departing from the scope of the present disclosure. As shown in FIG. 12, the orthogonal beam grouping 1200 comprises config=1 and config=2 1205, a config=3 1210, and a config=4 1215.

Figure 13:
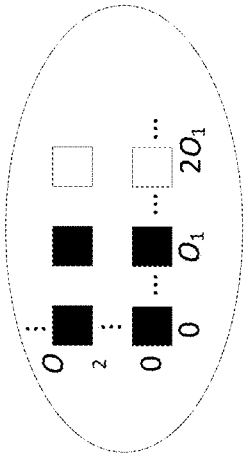
FIG. 13 illustrates yet another example orthogonal beam grouping for rank 5-8 according to embodiments of the present disclosure.
Figure 13:
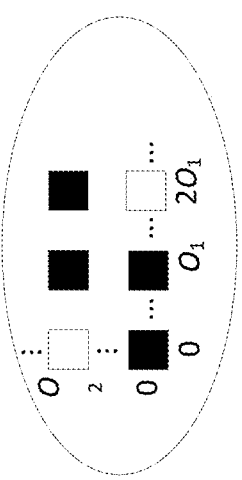
Figure 13:
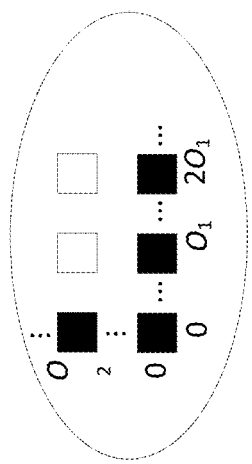

FIG. 13 illustrates yet another example orthogonal beam grouping 1300 for rank 5-8 according to embodiments of the present disclosure. An embodiment of the orthogonal beam grouping 1300 for rank 5-8 shown in FIG. 13 is for illustration only. Other embodiments may be used without departing from the scope of the present disclosure. As shown in FIG. 13, the orthogonal beam grouping 1300 comprises config=1 and config=2 1305, a config=3 1310, and a config=4 1315.

Figure 14:
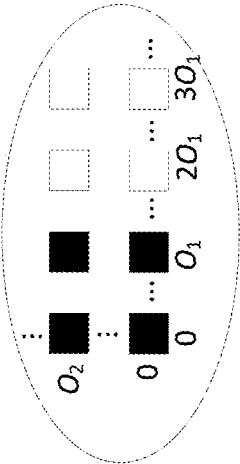
FIG. 14 illustrates yet another example orthogonal beam grouping for rank 5-8 according to embodiments of the present disclosure.
Figure 14:
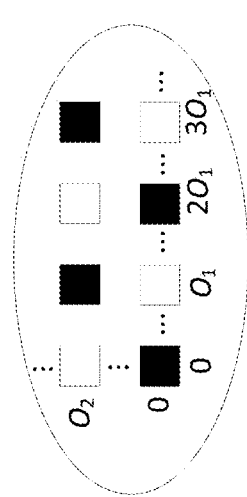
Figure 14:
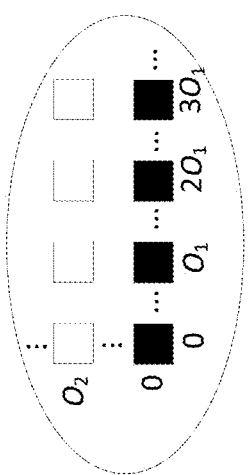

FIG. 14 illustrates yet another example orthogonal beam grouping 1400 for rank 5-8 according to embodiments of the present disclosure. An embodiment of the orthogonal beam grouping 1400 for rank 5-8 shown in FIG. 14 is for illustration only. Other embodiments may be used without departing from the scope of the present disclosure. As shown in FIG. 14, the orthogonal beam grouping 1400 comprises config=1 and config=2 1405, a config=3 1410, and a config=4 1415.

Figure 15:
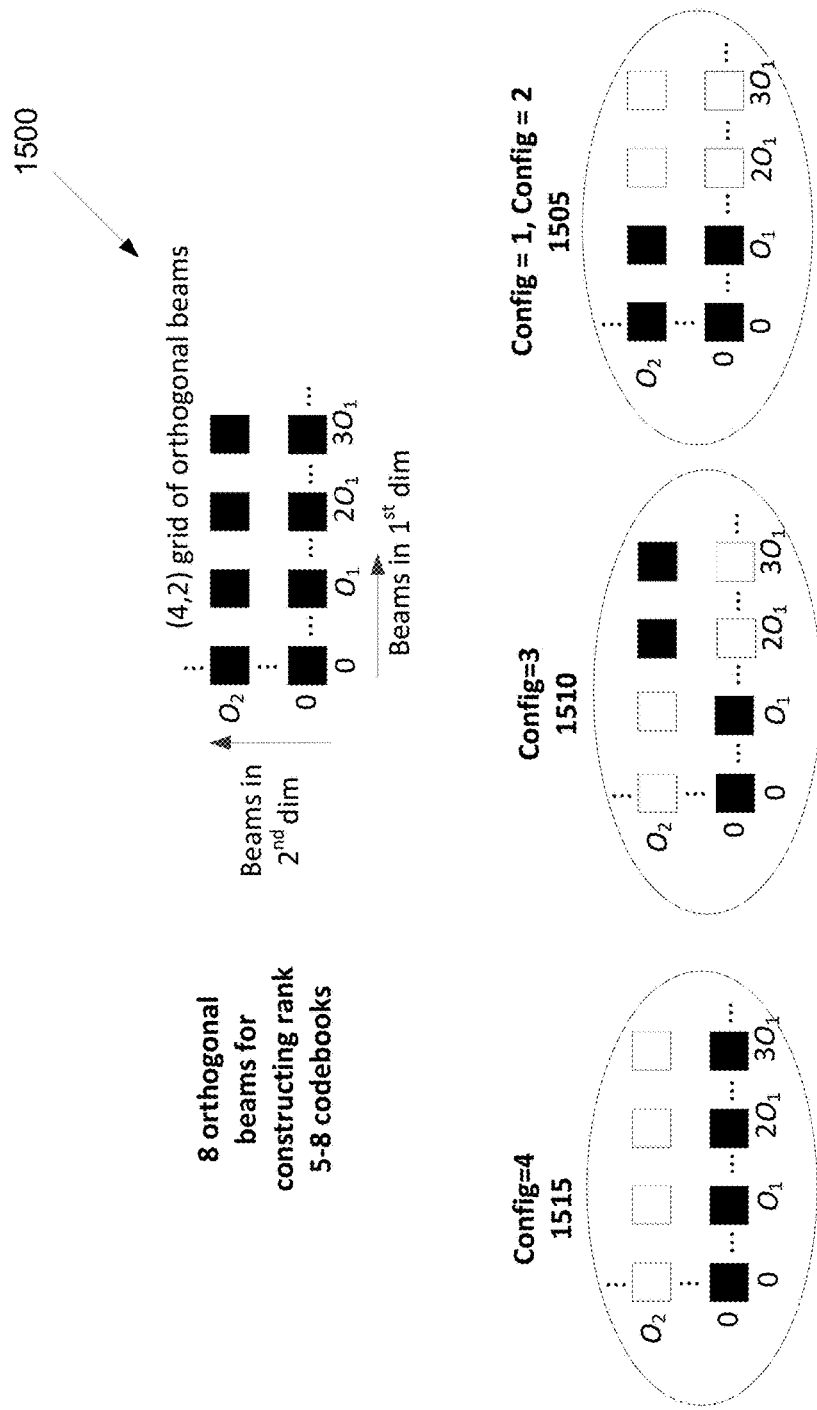
FIG. 15 illustrates yet another example orthogonal beam grouping for rank 5-8 according to embodiments of the present disclosure.

FIG. 15 illustrates yet another example orthogonal beam grouping 1500 for rank 5-8 according to embodiments of the present disclosure. An embodiment of the orthogonal beam grouping 1500 for rank 5-8 shown in FIG. 15 is for illustration only. Other embodiments may be used without departing from the scope of the present disclosure. As shown in FIG. 15, the orthogonal beam grouping 1500 comprises config=1 and config=2 1505, a config=3 1510, and a config=4 1515.

In some embodiments, as shown in FIG. 12, FIG. 13, FIG. 14, and FIG. 15, there are three orthogonal beam type configurations indexed by Config=1, 2, 3, 4 for rank 5-8 codebook, which are parameterized by $\delta_{1,1}$, $\delta_{1,2}$, $\delta_{1,3}$, $\delta_{2,1}$, $\delta_{2,2}$, $\delta_{2,3}$ values. Note that Config=1 and Config=2 corresponds to the same beam group. There are two alternatives for Config 3, which are shown in FIG. 12 and FIG. 13 for 12 ports, and in FIG. 14, and FIG. 15 for 16 ports. For 12 ports, $\delta_{1,1}$, $\delta_{1,2}$, $\delta_{1,3}$, $\delta_{2,1}$, $\delta_{2,2}$, $\delta_{2,3}$ are defined in TABLE 19, and for 16 ports they are defined in TABLE 20. TABLE 18 shows delta values for 12-port rank 5-8 codebooks.

TABLE 19

| | Antenna configuration | $\delta_{1,1}$ | $\delta_{1,2}$ | $\delta_{1,3}$ | $\delta_{2,1}$ | $\delta_{2,2}$ | $\delta_{2,3}$ |
|---|---|---|---|---|---|---|---|
| Config = 4 | $N_1 \geq N_2$ | $O_1$ | 0 | $2O_1$ | 0 | 0 | $O_2$ |
| | $N_1 < N_2$ | 0 | $O_2$ | 0 | $2O_2$ | $O_1$ | 0 |
| Config = 3, Alt 1 | $N_1 \geq N_2$ | $O_1$ | 0 | $2O_1$ | 0 | $O_1$ | $O_2$ |
| | $N_1 < N_2$ | 0 | $O_2$ | 0 | $2O_2$ | $O_1$ | $O_2$ |
| Config = 3, Alt 2 | $N_1 \geq N_2$ | $O_1$ | 0 | $O_1$ | $O_2$ | $2O_1$ | $O_2$ |
| | $N_1 < N_2$ | 0 | $O_2$ | $O_1$ | $O_2$ | $O_1$ | $2O_2$ |
| Config = 1, Config = 2 | Both | $O_1$ | 0 | $O_1$ | $O_2$ | 0 | $O_2$ |

TABLE 20 shows delta values for 16-port rank 5-8 codebooks.

TABLE 20

| | Antenna configuration | $\delta_{1,1}$ | $\delta_{1,2}$ | $\delta_{1,3}$ | $\delta_{2,1}$ | $\delta_{2,2}$ | $\delta_{2,3}$ |
|---|---|---|---|---|---|---|---|
| Config = 4 | $N_1 \geq N_2$ | $O_1$ | 0 | $2O_1$ | 0 | $3O_1$ | 0 |
| | $N_1 < N_2$ | 0 | $O_2$ | 0 | $2O_2$ | 0 | $3O_2$ |
| Config = 3, Alt 1 | $N_1 \geq N_2$ | $O_1$ | $O_2$ | $2O_1$ | 0 | $3O_1$ | $O_2$ |
| | $N_1 < N_2$ | O | $O_2$ | 0 | $2O_2$ | 0 | $3O_2$ |
| Config = 3, Alt 2 | $N_1 \geq N_2$ | $O_1$ | 0 | $2O_1$ | $O_2$ | $3O_1$ | $O_2$ |
| | $N_1 < N_2$ | 0 | $O_2$ | $O_1$ | $2O_2$ | $O_1$ | $3O_2$ |
| Config = 1, Config = 2 | Both | $O_1$ | 0 | $O_1$ | $O_2$ | 0 | $O_2$ |

In some embodiments, $(s_1, s_2)$ values for rank 5-8 codebook is given by TABLE 21 or TABLE 22. For $N_1 < N_2$, $(s_1, s_2)$ parameters are swapped if TABLE 21 is used. Note that for $N_2=1$, we have only Config 4. TABLE 21 shows $(s_1, s_2)$ parameters for rank 5-8 codebook for $N_1 \geq N_2$.

TABLE 21

| | | $(s_1, s_2)$ | $i_{1,1}$ | $i_{1,1}$ |
|---|---|---|---|---|
| If $N_1 > 1$ and $N_2 > 1$ | Config 4 | $(2, O_2/2)$ | 0-3 | 0-3 |
| | Config 1, Config 2 | $(O_1, O_2/2)$ | | |
| | Config 3 | $(O_1, O_2/2)$ | | |
| If $N_2 = 1$ | Config 4 | Alt 1: $(2, —)$ | — | — |
| | | Alt 2: $(O_1, —)$ | | |
| | | Alt 3: $(O_1/2, —)$ | | |

TABLE 22 shows $(s_1, s_2)$ parameters for rank 5-8 codebook.

TABLE 22

|  | | $(s_1, s_2)$ | $i_{1,1}$ | $i_{1,1}$ |
|---|---|---|---|---|
| If $N_1 > 1$ and $N_2 > 1$ | Config 4 | $(O_1N_1/4, O_2N_2/4)$ | 0-3 | 0-3 |
|  | Config 1, |  |  |  |
|  | Config 2 |  |  |  |
|  | Config 3 |  |  |  |
| If $N_2 = 1$ | Config 4 | $(O_1N_1/4, —)$ | 0-3 | — |

In some embodiments, a UE is configured with rank 5-8 codebook tables with the same effective oversampling factor, i.e., (4,4), for Config 1-4, which is aligned with rank 3-4 codebook parameter in TABLE 15 and also with LTE specification codebook. Accordingly, for 8 antenna ports, $(s_1, s_2)$ parameters for rank 5-8 codebook are given by TABLE 23. There may be two alternatives for $i_{1,1}$ (or $i_{1,2}$). In one example, $i_{1,1}$ (or $i_{1,2}$)=0-3, in which redundant $i_{1,1}$ (or $i_{1,2}$)=4-7 due to phase wrap around are not included. In another example, $i_{1,1}$ (or $i_{1,2}$)=0-3, in which redundant $i_{1,1}$ (or $i_{1,2}$)=4-7 due to phase wrap around are included. The aforementioned examples may be used in future when $N_1$ (or $N_2$)>2. TABLE 23 shows $(s_1, s_2)$ parameters for rank 5-8 codebook for $N_1 \geq N_2$: 8 ports.

TABLE 23

|  | | $(s_1, s_2)$ | $i_{1,1}$ (2 bits) | $i_{1,2}$ (2 bits) |
|---|---|---|---|---|
| If $N_1 > 1$ and $N_2 > 1$ | Config 2 | $(O_1/4, O_2/4)$ | Alt 1: 0-3 Alt 2: 0-7 | Alt 1: 0-3 Alt 2: 0-7 |

For 12 and 16 antenna ports, $(s_1, s_2)$ parameters are given by TABLE 24. Note that there may be two options for 1D case ($N_2=1$). In one example, an effective oversampling is 4. In another example, an effective oversampling is the configured oversampling factor $O_1$. Similar to 8 port case, the aforementioned examples are allowed for $i_{1,2}$ in case of Config 1-3. TABLE 24 shows $(s_1, s_2)$ parameters for rank 5-8 codebook: $N_1 \geq N_2$: 12, 16 ports.

TABLE 24

|  | | $(s_1, s_2)$ | $i_{1,1}$ | $i_{1,2}$ |
|---|---|---|---|---|
| If $N_1 > 1$ and $N_2 > 1$ | Config 4 | $(O_1/4, O_2/4)$ | $0-(O_1N_1/s_1-1) \rightarrow 0-(4N_1-1)$ | 0-7 |
|  | Config 1-3 |  | i.e., 0-11 for 12 ports 0-15 for 16 ports | Alt 1: 0-3 Alt 2: 0-7 |
| If $N_2 = 1$ | Config 4 | Option 1: $(O_1/4, —)$ Option 2: $(1, —)$ | Option 1: $0-(4N_1-1)$ Option 2: $0-(O_1N_1-1)$ | — |

In some embodiments, a UE is configured with rank 5-8 codebook tables with the same $(s_1, s_2)$ parameters such that the effective oversampling factor is the same as configured oversampling factors, i.e., according to TABLE 25. Again, two alternatives are allowed for $i_{1,2}$ in case of Config 1-3. TABLE 25 shows $(s_1, s_2)$ parameters for rank 5-8 codebook: $N_1 \geq N_2$: 12, 16 ports.

TABLE 25

|  | | $(s_1, s_2)$ | $i_{1,1}$ | $i_{1,2}$ |
|---|---|---|---|---|
| If $N_1 > 1$ and $N_2 > 1$ | Config 4 Config 1-3 | (1, 1) | $0-(O_1N_1-1)$ | $0-(O_2N_2-1)$ Alt 1: $0-(O_2N_2/2-1)$ Alt 2: $0-(O_2N_2-1)$ |
| If $N_2 = 1$ | Config 4 | (1, —) | $0-(O_1N_1-1)$ | — |

In some embodiments, a UE is configured with rank 5-8 codebook tables with the $(s_1, s_2)$ parameters such that the choice of parameter is constrained to use of the same number of $(i_{1,1}, i_{1,2})$ bits regardless of the Config parameter. For instance, if $i_{1,1}$ and $i_{1,2}$ are constrained to be 2 bits each, then the rank 5-8 codebook parameters are given by TABLE 26 for both 12 and 16 antenna ports. Note that there may be two options for Config 1-3 in TABLE 26. In one example, a leading beam index of orthogonal beam groups is a multiple of O.sub.1 for both 12 and 16 antenna ports (i.e., $N_1=3$ and 4). In another example, a leading beam index of orthogonal beam groups depends on the value of $N_1$, i.e., it is a multiple of $N_1$. For instance, for 12 antenna ports, the leading beam index is a multiple of 6, and for 16 antenna ports, the leading beam index is a multiple of 8. TABLE 26 shows $(s_1, s_2)$ parameters for rank 5-8 codebook for $N_1 \geq N_2$: 12, 16 ports.

TABLE 26

|  | | $(s_1, s_2)$ | $i_{1,1}$ (2 bits) | $i_{1,2}$ (2 bits) |
|---|---|---|---|---|
| If $N_1 > 1$ and $N_2 > 1$ | Config 4 Config 1-3 | $(O_1/4, O_2/2)$ Option 1: $(O_1, O_2/4)$ Option 2: $(O_1N_1/4, O_2/4)$ | 0-3 Option 1: 0-2 (12 ports) 0-3 (16 ports) Option 2: 0-3 | 0-3 |
| If $N_2 = 1$ | Config 4 | $(O_1N_1/4, —)$ | 0-3 | — |

TABLE-US-00023 TABLE 26 i.sub.1, 1 i.sub.1, 2 (s.sub.l, s.sub.2) (2 bits) (2 bits) If N.sub.1>1 Config 4 (O.sub.1/4, O.sub.2/2) 0-3 0-3 and N.sub.2>1 Config 1-3 Option 1: Option 1: 0-2 (O.sub.1, O.sub.2/4) (12 ports) Option 2: 0-3 (O.sub.1N.sub.1/4, O.sub.2/4) (16 ports) Option 2: 0-3 If N.sub.2=1 Config 4 (O.sub.1N.sub.1/4, --) 0-3--

Note that the above (s.sub.1, s.sub.2) parameter tables is for N.sub.1.gtoreq.N.sub.2 case. For N.sub.1<N.sub.2, the parameter table is obtained by swapping the dimension subscripts (1, 2) with (2, 1).

In some embodiments, the KP expressions can be swapped for the two configurations, i.e., if N.sub.1.gtoreq.N.sub.2, $$Wm1,m2,n(1)=1Q[um2vm1.PHI.num2vm1]; \quad \#\#EQU00059\#\#$$

and if N.sub.1<N.sub.2, $$Wm1,m2,n(1)=1Q[um1vm2.PHI.num1vm2]. \quad \#\#EQU00060\#\#$$

The aforementioned expressions may be applied various embodiments of the present disclosure for other ranks as well.

In some embodiments, the codebook table is parameterized with a parameter pair (d.sub.1, d.sub.2) which takes a value (d.sub.1, d.sub.2)=(1, 2) if N.sub.1.gtoreq.N.sub.2 and a value (d.sub.1, d.sub.2)=(2, 1) if N.sub.1<N.sub.2. In this case, the master rank-1 codebook is given by TABLES 27A and 27B, where
W m d 1, m d 2, n (1)=1 Q[v m d 1u m d2.PHI. n v m d 1 u m d 2],v m d 1=[1 j 2.pi. m d 1 O d N d 1 j 4 .pi. m d 1

O d N d j 6 .pi. m d 1 O d 1 N d 1]t, and ##EQU00061##u m d 2=[1 j 2.pi. m d 2 O d 2 N d 2]t. ##EQU00061.2##

TABLES 27A and 27B show a master codebook for 1 layer CSI reporting (e.g., parameterized). TABLE-US-00024 TABLE 27A i.sub.2' 0 1 Precoder W s d 1 i, d 1, s d 2 i 1, d 2, 0 (1) ##EQU00062## W s d 1 i 1, d 1, s d 2 i 1, d 2, 1 (1) ##EQU00063## i.sub.2' 2 3 Precoder W s d 1 i, d 1, s d 2 i 1, d 2, 2 (1)##EQU00064##W s d 1 i 1, d 1, s d 2 i 1, d 2, 3(1) ##EQU00065## i.sub.2' 4 5 Precoder W s d 1 i 1, d 1+1, s d 2 i 1, d 2, 0(1) ##EQU00066## W s d 1 i 1, d 1+1, s d 2 i 1, d 2, 1 (1) ##EQU00067## i.sub.2' 6 7 Precoder W s d 1 i 1, d 1+1, s d 2 i 1, d 2, 2 (1) ##EQU00068##W s d 1 i 1, d1+, s d 2 i 1, d 2, 3 (1) ##EQU00069##

TABLE-US-00025 TABLE 27B i'.sub.2 8 9 Precoder W s d 1 i 1, d 1+2, s d 2 i 1, d 2, 0(1) ##EQU00070## W s d 1 i 1, d 1+2, s d 2 i 1, d 2, 1 (1) ##EQU00071## i'.sub.2 10 11 Precoder W s d 1 i 1, d+2, s d 2 i 1, d 2, 2 (1)##EQU00072## W s d 1 i 1 i 1, d 1+2, s d 2 i 1, d 2, 3(1) ##EQU00073## i'.sub.2 12 13 Precoder W s d 1 i 1, d 1+3, s d 2 i 1, d 2, 0 (1) ##EQU00074## W s d 1 i, d 1+3, s d 2 i, d 2, 1 (1) ##EQU00075## i'.sub.2 14 15 Precoder W s d 1 i 1, d 1+3, s d 2 i 1, d 2, 2(1)##EQU00076##W s d 1 i 1, d 1+3, s d 2 3, s d 2 i 1, d 2, 3 (1) ##EQU00077## i'.sub.2 16-31 Precoder Entries 16-31 constructed with replacing the second subscript s d 2 i 1, d 2 with s d 2 i 1, d 2+1 in entries 0-15. ##EQU00078##

For rank 2-8, the parameterized master codebook can be constructed similarly.

In some embodiments, the order in which the Kronecker product is performed is dependent on the configuration. For instance, for the configuration in which N.sub. 1.gtoreq. N.sub.2, the UE derives the rank-1 pre-coder as $$W\ m1,m2,n(1)=1Q[v\ m1um2.PHI.n\ v\ m1um2],\quad \#\#EQU00079\#\#$$

and for the configuration in which N.sub.1<N.sub.2, the UE derives the rank-1 pre-coder as $$W\ m1,m2,n(1)=1Q[um2vm1.PHI.\ num2vm1].\quad \#\#EQU00080\#\#$$

Note that the orders in which the Kronecker product is performed in the two expressions are opposite in order to ensure that the dimensions of the two vectors to the left and to the right of Kronecker operator are the same in the two expressions.

Also note that in some embodiments the KP expressions can be swapped for the two configurations, i.e., if N.sub.1.gtoreq.N.sub.2, $$Wm1,m2,n(1)=1Q[um2vm1.PHI.\ num2vm1]\quad \#\#EQU00081\#\#$$

and if N.sub.1<N.sub.2, $$Wm1,m2,n(1)=1Q[v\ m1u\ m2.PHI.\ nvm1u\ m2].\quad \#\#EQU00082\#\#$$

The aforementioned expression may be applied to various embodiments of the present disclosure for other ranks as well.

For example, assuming antenna port numbering 2 for a 16 port configuration, the two expressions are given by:
(N1, N2)=(4,2) and, v m 1=[1 j 2.pi. m 1 O 1 N 1 j 4 .pi. m1 O 1 N 1 j 6 .pi. m 1 O 1 N 1] t and ##EQU00083## u m 2=[1 j 2.pi. m 2 O 2 N 2] t; and (N 1, N 2)=(2,4) and, v m 1=[j 2.pi. m 1 O 1 N 1]t and u m 2=[1 j 2.pi. m 2 O 2N 2 j 4 .pi. m 2 O 2 N 2 j 6 .pi. m 2 O 2 N 2] t. ##EQU00083.2##

Similarly, for 12 port configuration, the two expressions are given by:
(N 1, N 2)=(3, 2), and ##EQU00084## vm1=[j 2.pi. m 1 O 1 N j 4 .pi. m 1 O N 1] t and ##EQU00084.2## u m 2=[1 j 2.pi. m 2 O 2 N 2] t, and (N 1, N 2)=(2, 3), and ##EQU00084.3## v m 1=[1 j 2.pi. m 1 O 1 N 1] t and u m 2=[j 2.pi. m 2 O 2 N 2 j 4 .pi. m 2 O 2 N 2]t. ##EQU00084.4##

The aforementioned embodiment is applicable to the antenna port numbering 1, where (N.sub.1, N.sub.2)=(2, 4) for config A and for (N.sub.1, N.sub.2)=(4, 2) for config B. Note that even though W.sub.m.sub.1.sub., m.sub.2.sub., n expression is different in two configurations, the master rank-1 codebook table such as TABLE 2 can be used for both.

For rank-2, the pre-coding matrix is given by $$Wm1,m2,m1',m2',n(2)=12Q\\ [vm1um2vm1'um2'.PHI.nvm1um2-\\ .PHI.nvm1'um2']\quad \#\#EQU00085\#\#$$

for N.sub. 1.gtoreq.N.sub.2 (config A) and $$Wm1,m2,m1',m2',n(2)=12Q\\ [um2vm1um2'vm1'.PHI.num2vm1-.PHI.n\ u\\ m2'vm1']\quad \#\#EQU00086\#\#$$

for N.sub.1<N.sub.2 (config B).

The expressions for rank 3-8 for the two configurations can be expression similarly. Similar to rank-1, for rank 2-8 also, the master rank 2-8 codebooks in this case remain the same as aforementioned earlier in the present disclosure.

In addition, the beam grouping schemes or (L.sub.1, L.sub.2) configurations or codebook subset selection according to some embodiments of the present disclosure are applicable straightforwardly to this case once the master table for each of antenna port configurations is implemented.

In some embodiments, if the oversampling factor in the longer and shorter dimensions of the two symmetric port configurations is the same, then the pre-coder for one of the symmetric port configuration is derived from that for the other symmetric port configuration by applying a fixed mapping on the elements of the pre-coding vector.

In one embodiment, for the configuration in which N.sub. 1.gtoreq.N.sub.2 (config A), the UE derives the rank-1 pre-coder as $$Wm1,m2,n(1)=1Q[vm1um2.PHI.\ nvm1um2],\quad \#\#EQU00087\#\#$$

and for the configuration in which N.sub.1<N.sub.2 (config B), the UE derives the rank-1 pre-coder as $$Wm1,m2,n(1)=1Q[.sigma.(v\ m1um2).PHI.n.sigma.\\ (vmlum2)],\quad \#\#EQU00088\#\#$$

where the mapping function is defined as $$.sigma.(a0a1aN2-1b\ b1b\ N2-1)=(a0b0a1b1a2aN2-\\ 1bN2-1)\quad \#\#EQU00089\#\#$$

Note that here the assumption is that O.sub.1 and O.sub.2 in case of N.sub.1.gtoreq.N.sub.2 is the same as O.sub.2 and O.sub.1 in case of N.sub.1<N.sub.2, respectively.

In one example, for (N.sub.1, N.sub.2)=(4, 2) with (O.sub.1, O.sub.2)=(8, 16),
v m 1=[1 j 2.pi. n 1 32 j 4 .pi. n 1 32 j 6 .pi. n 1 32] t and ##EQU00090## u m 2=[1 j 2.pi. n 2 32] t, ##EQU00090.2## hence $$vm1um2=[1j2.pi.\ n232j2.pi.\ n1\ 32j2.pi.\ n2(m1+\\ m232)j4.pi.\ n1\ 32j2.pi.(2m\ 1+m2\ 32)j6.pi.\ n1\\ 32j2.pi.(3m1+m2\ 32)];\quad \#\#EQU00091\#\#$$

and for (N.sub.1, N.sub.2)=(2,4) with (O.sub.1, O.sub.2)= (16,8), $$vm2=[1j2.pi.\ n232]t\ \text{and}\ um=[1j2.pi.n1\ 32j4.pi.n1\\ 32j6.pi.n1\ 32]t,\quad \#\#EQU00092\#\#$$

hence $$vm2um1=[1j2.pi.\ n132j4.pi.\ n132j6.pi.\ n132j2.pi.\\ n232j2.pi.(m1+m232)j2.pi.(2m1+m232)j2.pi.\\ (3m1+m232)],\quad \#\#EQU00093\#\#$$

which can be obtained by applying the permutation .sigma. ({1 2 3 4 5 6 7 8})={1 3 5 7 2 4 6 8} on the components of

[1.*j*2.*pi.n*2*j*2.*pi.n*1*j*2.*pi.*(*m*1+*m*2*j*2)*j*4.*pi.n*1*j*2.*pi.*(2*m*1+*m*2*j*2)*j*6.*pi.n*1*j*2.*pi.*(3*m*1+*m*2*j*2)].   ##EQU00094##

In another embodiment, the pre-coder for N.sub.1.gtoreq.N.sub.2 can be derived by applying a similar fixed mapping on the pre-coder for N.sub.1<N.sub.2 case. For rank 2-8, the mapping can be constructed similarly.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
   a transceiver configured to receive, from an eNodeB (eNB), downlink signals indicating precoder codebook parameters that include a first number of antenna ports ($N_1$) for a first dimension, a second number of antenna ports ($N_2$) for a second dimension, and a codebook configuration; and
   at least one processor configured to swap precoder matrix indicator (PMI) expressions based on the first number of antenna ports ($N_1$) and the second number of antenna ports ($N_2$), and the codebook configuration in order to derive a first PMI pair ($i_{1,1}$, $i_{1,2}$), and a second PMI ($i_2$) using a single precoder codebook, wherein the transceiver is further configured to transmit, to the eNB, channel state information (CSI) including the first PMI pair and the second PMI.

2. The UE of claim 1, wherein the at least one processor is further configured to:
   identify a pair of parameters ($d_1$, $d_2$) based on the first number of antenna ports ($N_1$) and the second number of antenna ports ($N_2$); and
   parameterize a codebook table based on the identified pair of parameters ($d_1$, $d_2$).

3. The UE of claim 2, wherein the identified pair of parameters ($d_1$, $d_2$) are defined as at least one of:
   ($d_1$, $d_2$)=(1, 2) when the first number of antenna ports ($N_1$) is greater or equal to the $N_2$; or
   ($d_1$, $d_2$)=(2, 1) when the first number of antenna ports ($N_1$) is less than the second number of antenna ports ($N_2$).

4. The UE of claim 3, wherein the at least one processor is further configured to determine dummy variables including x and y based on a pair of parameters ($d_1$, $d_2$) in accordance with the first number of antenna ports ($N_1$) and the second number of antenna ports ($N_2$), the dummy variables being determined as:

$x = i_{1,d1}$ and $y = i_{1,d2}$.

5. The UE of claim 1, wherein:
   the swapped PMI expressions in a rank 1 codebook and a rank 2 codebook for a codebook configuration 3 and a codebook configuration 4 comprise an order of ($m_1$, $m_2$) based on the first number of antenna ports ($N_1$) and the second number of antenna ports ($N_2$), and wherein $m_1$ is an index of a first discrete Fourier transform (DFT) vector representing a beam for the first dimension, $m_2$ is an index of a second DFT vector representing a beam for the second dimension, and ($m_1$, $m_2$) is an index pair of a two-dimensional DFT vector ($w_{m_1,m_2}$) representing a beam, $$w_{m_1,m_2} = \left[ u_{m_2} \ e^{j\frac{2\pi m_1}{O_1 N_1}} u_{m_2} \ \ldots \ e^{j\frac{2\pi m_1 (N_1-1)}{O_1 N_1}} u_{m_2} \right]^T$$

where $u_{m_2} = \left[ 1 \ e^{j\frac{2\pi m_2}{O_2 N_2}} \ \ldots \ e^{j\frac{2\pi m_2 (N_2-1)}{O_2 N_2}} \right]$, a range of $m_1$ is $$0, 1, \ldots, \frac{N_1 O_1}{2} - 1$$

and a range of $m_2$ is $$0, 1, \ldots, \frac{N_2 O_2}{2} - 1, \text{ and}$$

and $O_1$ is a first oversampling factor for the first dimension and $O_2$ is a second oversampling factor for the second dimension.

6. The UE of claim 5, wherein the order of ($m_1$, $m_2$) is defined as at least one of:
   ($m_1$, $m_2$) when the first number of antenna ports ($N_1$) is greater than or equal to the second number of antenna ports ($N_2$); or
   ($m_2$, $m_1$) when the first number of antenna ports ($N_1$) is less than the second number of antenna ports ($N_2$).

7. The UE of claim 6, wherein,
   when the first number of antenna ports ($N_1$) is greater than or equal to the second number of antenna ports ($N_2$), a rank 1 precoder based on the swapped PMI expressions is determined as:

$$W^{(1)}_{m_1,m_2,n} = \frac{1}{\sqrt{Q}} \begin{bmatrix} w_{m_1,m_2} \\ \varphi_n w_{m_1,m_2} \end{bmatrix};$$

and a rank 2 precoder based on the swapped PMI expressions is determined as:

$$W^{(2)}_{m_1,m_2,m'_1,m'_2,n} = \frac{1}{\sqrt{2Q}} \begin{bmatrix} w_{m_1,m_2} & w_{m'_1,m'_2} \\ \varphi_n w_{m_1,m_2} & -\varphi_n w_{m'_1,m'_2} \end{bmatrix};$$

and
when the first number of antenna ports ($N_1$) is less than the second number of antenna ports ($N_1$), a rank 1 precoder based on the swapped PMI expressions is determined as:

$$W^{(1)}_{m_1,m_2,n} = \frac{1}{\sqrt{Q}} \begin{bmatrix} w_{m_2,m_1} \\ \varphi_n w_{m_2,m_1} \end{bmatrix};$$

and a rank 2 precoder based on the swapped PMI expressions is determined as:

$$W^{(2)}_{m_1,m_2,m'_1,m'_2,n} = \frac{1}{\sqrt{2Q}} \begin{bmatrix} w_{m_2,m_1} & w_{m'_2,m'_1} \\ \phi_n w_{m_2,m_1} & -\phi_n w_{m'_2,m'_1} \end{bmatrix},$$

where $Q = 2N_1 N_2$ and $\phi_n = e^{j\pi n/2}$.

8. The UE of claim 4, wherein a rank 1 codebook for a codebook configuration 3 is determined based on the dummy variables including the x and y according to a following codebook table:

| $i_2$ | | | |
|---|---|---|---|
| 0 | 1 | 2 | 3 |
| $W_{2x,2y,0}^{(1)}$ | $W_{2x,2y,1}^{(1)}$ | $W_{2x,2y,2}^{(1)}$ | $W_{2x,2y,3}^{(1)}$ |

| $i_2$ | | | |
|---|---|---|---|
| 4 | 5 | 6 | 7 |
| $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| $i_2$ | | | |
|---|---|---|---|
| 8 | 9 | 10 | 11 |
| $W_{2x+1,2y+1,0}^{(1)}$ | $W_{2x+1,2y+1,1}^{(1)}$ | $W_{2x+1,2y+1,2}^{(1)}$ | $W_{2x+1,2y+1,3}^{(1)}$ |

| $i_2$ | | | |
|---|---|---|---|
| 12 | 13 | 14 | 15 |
| $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ | where $$x = i_{1,1}, y = i_{1,2}, W_{m_1,m_2,n}^{(1)} = \frac{1}{\sqrt{Q}} \begin{bmatrix} w_{m_1,m_2} \\ \varphi_n w_{m_1,m_2} \end{bmatrix}, \text{ if } N_1 \geq N_2$$

$$x = i_{1,2}, y = i_{1,1}, W_{m_1,m_2,n}^{(1)} = \frac{1}{\sqrt{Q}} \begin{bmatrix} w_{m_2,m_1} \\ \varphi_n w_{m_2,m_1} \end{bmatrix}, \text{ if } N_1 < N_2;$$

and
the rank 1 codebook for a codebook configuration 4 is determined based on the dummy variables including the x and y according to a following codebook table:

| $i_2$ | | | |
|---|---|---|---|
| 0 | 1 | 2 | 3 |
| $W_{2x,2y,0}^{(1)}$ | $W_{2x,2y,1}^{(1)}$ | $W_{2x,2y,2}^{(1)}$ | $W_{2x,2y,3}^{(1)}$ |

| $i_2$ | | | |
|---|---|---|---|
| 4 | 5 | 6 | 7 |
| $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| $i_2$ | | | |
|---|---|---|---|
| 8 | 9 | 10 | 11 |
| $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| $i_2$ | | | |
|---|---|---|---|
| 12 | 13 | 14 | 15 |
| $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $$x = i_{1,1}, y = i_{1,2}, W_{m_1,m_2,n}^{(1)} = \frac{1}{\sqrt{Q}} \begin{bmatrix} w_{m_1,m_2} \\ \varphi_n w_{m_1,m_2} \end{bmatrix}, \text{ if } N_1 \geq N_2$$

$$x = i_{1,2}, y = i_{1,1}, W_{m_1,m_2,n}^{(1)} = \frac{1}{\sqrt{Q}} \begin{bmatrix} w_{m_2,m_1} \\ \varphi_n w_{m_2,m_1} \end{bmatrix}, \text{ if } N_1 < N_2;$$

wherein $m_1$ is an index of a first Fourier transform (DFT) vector representing a beam for the first dimension, $m_2$ is an index of a second DFT vector representing a beam for the second dimension, n is an index of a co-phase $\phi_n$, and $$w_{m_1,m_2} = \begin{bmatrix} u_{m_2} & e^{j\frac{2\pi m_1}{O_1 N_1}} u_{m_2} & \cdots & e^{j\frac{2\pi m_1(N_1-1)}{O_1 N_1}} u_{m_2} \end{bmatrix}^T \text{ where}$$

$$u_{m_2} = \begin{bmatrix} 1 & e^{j\frac{2\pi m_2}{O_2 N_2}} & \cdots & e^{j\frac{2\pi m_2(N_2-1)}{O_2 N_2}} \end{bmatrix}, \text{ where } \varphi_n = e^{j\pi n/2}.$$

9. The UE of claim 4, wherein a rank 2 codebook for a codebook configuration 3 is determined based on the dummy variables including the x and y according to a following codebook table:

| $i_2$ | |
|---|---|
| 0 | 1 |
| $W_{2x,2x,2y,2y,0}^{(2)}$ | $W_{2x,2x,2y,2y,1}^{(2)}$ |

| $i_2$ | |
|---|---|
| 2 | 3 |
| $W_{2x+1,2x+1,2y+1,2y+1,0}^{(2)}$ | $W_{2x+1,2x+1,2y+1,2y+1,1}^{(2)}$ |

| $i_2$ | |
|---|---|
| 4 | 5 |
| $W_{2x+2,2x+2,2y,2y,0}^{(2)}$ | $W_{2x+2,2x+2,2y,2y,1}^{(2)}$ |

| $i_2$ | |
|---|---|
| 6 | 7 |
| $W_{2x+3,2x+3,2y+1,2y+1,0}^{(2)}$ | $W_{2x+3,2x+3,2y+1,2y+1,1}^{(2)}$ |

| $i_2$ | |
|---|---|
| 8 | 9 |
| $W_{2x,2x+1,2y,2y+1,0}^{(2)}$ | $W_{2x,2x+1,2y,2y+1,1}^{(2)}$ |

| $i_2$ | |
|---|---|
| 10 | 11 |
| $W_{2x+1,2x+2,2y+1,2y,0}^{(2)}$ | $W_{2x+1,2x+2,2y+1,2y,1}^{(2)}$ |

| $i_2$ | |
|---|---|
| 12 | 13 |
| $W_{2x,2x+3,2y,2y+1,0}^{(2)}$ | $W_{2x,2x+3,2y,2y+1,1}^{(2)}$ |

| $i_2$ | |
|---|---|
| 14 | 15 |
| $W_{2x+1,2x+3,2y+1,2y+1,0}^{(2)}$ | $W_{2x+1,2x+3,2y+1,2y+1,1}^{(2)}$ | where $$x = i_{1,1}, y = i_{1,2}, W_{m_1,m_2,m_1',m_2',n}^{(2)} = \frac{1}{\sqrt{2Q}} \begin{bmatrix} w_{m_1,m_2} & w_{m_1',m_2'} \\ \varphi_n w_{m_1,m_2} & -\varphi_n w_{m_1',m_2'} \end{bmatrix},$$

if $N_1 \geq N_2$ and $$x = i_{1,2}, y = i_{1,1}, W_{m_1,m_2,m_1',m_2',n}^{(2)} = \frac{1}{\sqrt{2Q}} \begin{bmatrix} w_{m_2,m_1} & w_{m_2',m_1'} \\ \varphi_n w_{m_2,m_1} & -\varphi_n w_{m_2',m_1'} \end{bmatrix},$$

if $N_1 < N_2$ and
the rank 2 codebook for a codebook configuration 4 is determined based on the dummy variables including the x and y according to a following codebook table:

| $i_2$ | |
|---|---|
| 0 | 1 |
| $W^{(2)}_{2x,2x,2y,2y,0}$ | $W^{(2)}_{2x,2x,2y,2y,1}$ |
| 2 | 3 |
| $W^{(2)}_{2x+1,2x+1,2y,2y,0}$ | $W^{(2)}_{2x+1,2x+1,2y,2y,1}$ |

| $i_2$ | |
|---|---|
| 4 | 5 |
| $W^{(2)}_{2x+2,2x+2,2y,2y,0}$ | $W^{(2)}_{2x+2,2x+2,2y,2y,1}$ |
| 6 | 7 |
| $W^{(2)}_{2x+3,2x+3,2y,2y,0}$ | $W^{(2)}_{2x+3,2x+3,2y,2y,1}$ |

| $i_2$ | |
|---|---|
| 8 | 9 |
| $W^{(2)}_{2x,2x+1,2y,2y,0}$ | $W^{(2)}_{2x,2x+1,2y,2y,1}$ |
| 10 | 11 |
| $W^{(2)}_{2x+1,2x+2,2y,2y,0}$ | $W^{(2)}_{2x+1,2x+2,2y,2y,1}$ |

| $i_2$ | |
|---|---|
| 12 | 13 |
| $W^{(2)}_{2x,2x+3,2y,2y,0}$ | $W^{(2)}_{2x,2x+3,2y,2y,1}$ |
| 14 | 15 |
| $W^{(2)}_{2x+1,2x+3,2y,2y,0}$ | $W^{(2)}_{2x+1,2x+3,2y,2y,1}$ | where $$x = i_{1,1},\ y = i_{1,2},\ W^{(2)}_{m_1,m_2,m'_1,m'_2,n} = \frac{1}{\sqrt{2Q}} \begin{bmatrix} w_{m_1,m_2} & w_{m'_1,m'_2} \\ \varphi_n w_{m_1,m_2} & -\varphi_n w_{m'_1,m'_2} \end{bmatrix},$$

if $N_1 \geq N_2$ and $$x = i_{1,2},\ y = i_{1,1},\ W^{(2)}_{m_1,m_2,m'_1,m'_2,n} = \frac{1}{\sqrt{2Q}} \begin{bmatrix} w_{m_2,m_1} & w_{m'_2,m'_1} \\ \varphi_n w_{m_2,m_1} & -\varphi_n w_{m'_2,m'_1} \end{bmatrix},$$

if $N_1 < N_2$ wherein $m_1$ is an index of a first Fourier transform (DFT) vector representing a beam for the first dimension, $m_2$ is an index of a second DFT vector representing a beam for the second dimension, n is an index of the co-phase $\varphi_n$, and $$w_{m_1,m_2} = \begin{bmatrix} u_{m_2} & e^{j\frac{2\pi m_1}{O_1 N_1}} u_{m_2} & \ldots & e^{j\frac{2\pi m_1 (N_1-1)}{O_1 N_1}} u_{m_2} \end{bmatrix}^T \text{ where}$$

$$u_{m_2} = \begin{bmatrix} 1 & e^{j\frac{2\pi m_2}{O_2 N_2}} & \ldots & e^{j\frac{2\pi m_2 (N_2-1)}{O_2 N_2}} \end{bmatrix}, \text{ where } \varphi_n = e^{j\pi n/2}.$$

10. An eNodeB (eNB) in a wireless communication system, the eNB comprising:
 a transceiver configured to:
  transmit downlink signals, to a user equipment (UE), indicating precoder codebook parameters that include a first number of antenna ports ($N_1$) for a first dimension, a second number of antenna ports ($N_2$) for a second dimension, and a codebook configuration; and
  receive, from the UE, channel state information (CSI) including a first PMI pair ($i_{1,1}$, $i_{1,2}$) and a second PMI ($i_2$); and
 at least one processor configured to swap precoder matrix indicator (PMI) expressions based on the first number of antenna ports ($N_1$) and the second number of antenna ports ($N_2$), and the codebook configuration in order to reconstruct a PMI precoder using a single precoder codebook based on the received first PMI pair and second PMI.

11. The eNB of claim 10, wherein the at least one processor is further configured to:
 identify a pair of parameters ($d_1$, $d_2$) based on the first number of antenna ports ($N_1$) and the second number of antenna ports ($N_2$); and
 parameterize a codebook table based on the identified pair of parameters ($d_1$, $d_2$), wherein the identified pair of parameters ($d_1$, $d_2$) is defined as at least one of:
  ($d_1$, $d_2$)=(1, 2) when the first number of antenna ports ($N_1$) is greater or equal to the second number of antenna ports ($N_2$); or
  ($d_1$, $d_2$)=(2, 1) when the first number of antenna ports ($N_1$) is less than the second number of antenna ports ($N_2$); and
 determine dummy variables including x and y based on the identified pair of parameters ($d_1$, $d_2$) in accordance with the first number of antenna ports ($N_1$) and the second number of antenna ports ($N_2$), the dummy variables being determined as:

$$x = i_{1,d1} \text{ and } y = i_{1,d2}.$$

12. A method for operating user equipment (UE) in a wireless communication system, the method comprising:
 receiving, from an eNodeB (eNB), downlink signals indicating precoder codebook parameters that include a first number of antenna ports ($N_1$) for a first dimension, a second number of antenna ports ($N_2$) for a second dimension, and a codebook configuration;
 swapping precoder matrix indicator (PMI) expressions based on the first number of antenna ports ($N_1$) and the second number of antenna ports ($N_2$), and the codebook configuration in order to derive a first PMI pair ($i_{1,1}$, $i_{1,2}$), and a second PMI ($i_2$) using a single precoder codebook; and
 transmitting, to the eNB, channel state information (CSI) including the first PMI pair and the second PMI.

13. The method of claim 12, further comprising:
 identifying a pair of parameters ($d_1$, $d_2$) based on the first number of antenna ports ($N_1$) and the second number of antenna ports ($N_2$); and
 parameterizing a codebook table based on the identified pair of parameters ($d_1$, $d_2$).

14. The method of claim 13, wherein the identified pair of parameters ($d_1$, $d_2$) are defined as at least one of:
 ($d_1$, $d_2$)=(1, 2) when the first number of antenna ports ($N_1$) is greater or equal to the second number of antenna ports ($N_2$); or
 ($d_1$, $d_2$)=(2, 1) when the first number of antenna ports ($N_1$) is less than the second number of antenna ports ($N_2$).

15. The method of claim 14, further comprising determining dummy variables including x and y based on a pair of parameters ($d_1$, $d_2$) in accordance with the first number of antenna ports ($N_1$) and second number of antenna ports ($N_2$), the dummy variables being determined as:

$$x = i_{1,d1} \text{ and } y = i_{1,d2}.$$

16. The method of claim 12, wherein:
 the swapped PMI expressions in a rank 1 codebook and a rank 2 codebook for a codebook configuration 3 and a codebook configuration 4 comprise an order of ($m_1$, $m_2$) based on the first number of antenna ports ($N_1$) and second number of antenna ports ($N_2$), and wherein $m_1$ is an index of a first discrete Fourier transform (DFT) vector representing a beam for the first dimension, $m_2$ is an index of a second DFT vector representing a beam for the second dimension, and ($m_1$, $m_2$) is an index pair of a two-dimensional DFT vector ($w_{m_1,m_2}$) representing a beam, $$w_{m_1,m_2} = \begin{bmatrix} u_{m_2} & e^{j\frac{2\pi m_1}{O_1 N_1}} u_{m_2} & \cdots & e^{j\frac{2\pi m_1 (N_1-1)}{O_1 N_1}} u_{m_2} \end{bmatrix}^T \text{ where}$$

$$u_{m_2} = \begin{bmatrix} 1 & e^{j\frac{2\pi m_2}{O_2 N_2}} & \cdots & e^{j\frac{2\pi m_2 (N_2-1)}{O_2 N_2}} \end{bmatrix},$$

a range of $m_1$ is $$0, 1, \ldots, \frac{N_1 O_1}{2} - 1$$

and a range of $m_2$ is $$0, 1, \ldots, \frac{N_2 O_2}{2} - 1, \text{ and}$$

$O_1$ is a first oversampling factor for the first dimension and $O_2$ is a second oversampling factor for the second dimension.

17. The method of claim 16, wherein the order of ($m_1$, $m_2$) is defined as at least one of:
 ($m_1$, $m_2$) when the first number of antenna ports ($N_1$) is greater than or equal to the second number of antenna ports ($N_2$); or
 ($m_2$, $m_1$) when the first number of antenna ports ($N_1$) is less than the second number of antenna ports ($N_2$).

18. The method of claim 17, wherein:
 when the first number of antenna ports ($N_1$) is greater than or equal to the second number of antenna ports ($N_2$), a rank 1 precoder based on the swapped PMI expressions is determined as:

$$W^{(1)}_{m_1,m_2,n} = \frac{1}{\sqrt{Q}} \begin{bmatrix} w_{m_1,m_2} \\ \varphi_n w_{m_1,m_2} \end{bmatrix};$$

and a rank 2 precoder based on the swapped PMI expressions is determined as:

$$W^{(2)}_{m_1,m_2,m'_1,m'_2,n} = \frac{1}{\sqrt{2Q}} \begin{bmatrix} w_{m_1,m_2} & w_{m'_1,m'_2} \\ \varphi_n w_{m_1,m_2} & -\varphi_n w_{m'_1,m'_2} \end{bmatrix};$$

and
 when the first number of antenna ports ($N_1$) is less than the second number of antenna ports ($N_2$), the rank 1 precoder based on the swapped PMI expressions is determined as:

$$W^{(1)}_{m_1,m_2,n} = \frac{1}{\sqrt{Q}} \begin{bmatrix} w_{m_2,m_1} \\ \varphi_n w_{m_2,m_1} \end{bmatrix};$$

and a rank 2 precoder based on the swapped PMI expressions is determined as:

$$W^{(2)}_{m_1,m_2,m'_1,m'_2,n} = \frac{1}{\sqrt{2Q}} \begin{bmatrix} w_{m_2,m_1} & w_{m'_2,m'_1} \\ \phi_n w_{m_2,m_1} & -\phi_n w_{m'_2,m'_1} \end{bmatrix},$$

where $Q = 2N_1 N_2$ and $\phi_n = e^{j\pi n/2}$.

19. The method of claim 15, wherein a rank 1 codebook for a codebook configuration 3 is determined based on the dummy variables including the x and y according to a following codebook table:

| | | $i_2$ | | |
|---|---|---|---|---|
| | 0 | 1 | 2 | 3 |
| | $W^{(1)}_{2x,2y,0}$ | $W^{(1)}_{2x,2y,1}$ | $W^{(1)}_{2x,2y,2}$ | $W^{(1)}_{2x,2y,3}$ |
| | | $i_2$ | | |
| | 4 | 5 | 6 | 7 |
| | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |
| | | $i_2$ | | |
| | 8 | 9 | 10 | 11 |
| | $W^{(1)}_{2x+1,2y+1,0}$ | $W^{(1)}_{2x+1,2y+1,1}$ | $W^{(1)}_{2x+1,2y+1,2}$ | $W^{(1)}_{2x+1,2y+1,3}$ |
| | | $i_2$ | | |
| | 12 | 13 | 14 | 15 |
| | $W^{(1)}_{2x+3,2y+1,0}$ | $W^{(1)}_{2x+3,2y+1,1}$ | $W^{(1)}_{2x+3,2y+1,2}$ | $W^{(1)}_{2x+3,2y+1,3}$ | where $$x = i_{1,1}, y = i_{1,2}, W^{(1)}_{m_1,m_2,n} = \frac{1}{\sqrt{Q}} \begin{bmatrix} w_{m_1,m_2} \\ \varphi_n w_{m_1,m_2} \end{bmatrix}, \text{ if } N_1 \geq N_2$$

$$x = i_{1,2}, y = i_{1,1}, W^{(1)}_{m_1,m_2,n} = \frac{1}{\sqrt{Q}} \begin{bmatrix} w_{m_2,m_1} \\ \varphi_n w_{m_2,m_1} \end{bmatrix}, \text{ if } N_1 < N_2;$$

and
 the rank 1 codebook for a codebook configuration 4 is determined based on the dummy variables including the x and y according to a following codebook table:

| | | $i_2$ | | |
|---|---|---|---|---|
| | 0 | 1 | 2 | 3 |
| | $W^{(1)}_{2x,2y,0}$ | $W^{(1)}_{2x,2y,1}$ | $W^{(1)}_{2x,2y,2}$ | $W^{(1)}_{2x,2y,3}$ |
| | | $i_2$ | | |
| | 4 | 5 | 6 | 7 |
| | $W^{(1)}_{2x+1,2y,0}$ | $W^{(1)}_{2x+1,2y,1}$ | $W^{(1)}_{2x+1,2y,2}$ | $W^{(1)}_{2x+1,2y,3}$ |

-continued

| | $i_2$ | | |
|---|---|---|---|
| 8 | 9 | 10 | 11 |
| $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| | $i_2$ | | |
|---|---|---|---|
| 12 | 13 | 14 | 15 |
| $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $$x = i_{1,1},\ y = i_{1,2},\ W_{m_1,m_2,n}^{(1)} = \frac{1}{\sqrt{Q}} \begin{bmatrix} w_{m_1,m_2} \\ \varphi_n w_{m_1,m_2} \end{bmatrix},\ \text{if } N_1 \geq N_2$$

$$x = i_{1,2},\ y = i_{1,1},\ W_{m_1,m_2,n}^{(1)} = \frac{1}{\sqrt{Q}} \begin{bmatrix} w_{m_2,m_1} \\ \varphi_n w_{m_2,m_1} \end{bmatrix},\ \text{if } N_1 < N_2;$$

wherein $m_1$ is an index of a first discrete Fourier transform (DFT) vector representing a beam for the first dimension, $m_2$ is an index of a second DFT vector representing a beam for the second dimension, n is an index of the co-phase $\phi_n$, and $$w_{m_1,m_2} = \begin{bmatrix} u_{m_2} & e^{j\frac{2\pi m_1}{O_1 N_1}} u_{m_2} & \ldots & e^{j\frac{2\pi m_1(N_1-1)}{O_1 N_1}} u_{m_2} \end{bmatrix}^T \text{ where}$$

$$u_{m_2} = \begin{bmatrix} 1 & e^{j\frac{2\pi m_2}{O_2 N_2}} & \ldots & e^{j\frac{2\pi m_2(N_2-1)}{O_2 N_2}} \end{bmatrix},\ \text{where } \varphi_n = e^{j\pi n/2}.$$

20. The method of claim 15, wherein a rank 2 codebook for a codebook configuration 3 is determined based on the dummy variables including the x and y according to a following codebook table:

| $i_2$ | |
|---|---|
| 0 | 1 |
| $W_{2x,2x,2y,2y,0}^{(2)}$ | $W_{2x,2x,2y,2y,1}^{(2)}$ |
| 2 | 3 |
| $W_{2x+1,2x+1,2y+1,2y+1,0}^{(2)}$ | $W_{2x+1,2x+1,2y+1,2y+1,1}^{(2)}$ |

| $i_2$ | |
|---|---|
| 4 | 5 |
| $W_{2x+2,2x+2,2y,2y,0}^{(2)}$ | $W_{2x+2,2x+2,2y,2y,1}^{(2)}$ |
| 6 | 7 |
| $W_{2x+3,2x+3,2y+1,2y+1,0}^{(2)}$ | $W_{2x+3,2x+3,2y+1,2y+1,1}^{(2)}$ |

| $i_2$ | |
|---|---|
| 8 | 9 |
| $W_{2x,2x+1,2y,2y,0}^{(2)}$ | $W_{2x,2x+1,2y,2y,1}^{(2)}$ |
| 10 | 11 |
| $W_{2x+1,2x+2,2y+1,2y,0}^{(2)}$ | $W_{2x+1,2x+2,2y+1,2y,1}^{(2)}$ |

| $i_2$ | |
|---|---|
| 12 | 13 |
| $W_{2x,2x+3,2y+1,0}^{(2)}$ | $W_{2x,2x+3,2y,2y+1,1}^{(2)}$ |
| 14 | 15 |
| $W_{2x+1,2x+3,2y+1,2y,0}^{(2)}$ | $W_{2x+1,2x+3,2y+1,2y,1}^{(2)}$ | where $$x = i_{1,1},\ y = i_{1,2},\ W_{m_1,m_2,m_1',m_2',n}^{(2)} = \frac{1}{\sqrt{2Q}} \begin{bmatrix} w_{m_1,m_2} & w_{m_1',m_2'} \\ \varphi_n w_{m_1,m_2} & -\varphi_n w_{m_1',m_2'} \end{bmatrix},$$

if $N_1 \geq N_2$ and $$x = i_{1,2},\ y = i_{1,1},\ W_{m_1,m_2,m_1',m_2',n}^{(2)} = \frac{1}{\sqrt{2Q}} \begin{bmatrix} w_{m_2,m_1} & w_{m_2',m_1'} \\ \varphi_n w_{m_2,m_1} & -\varphi_n w_{m_2',m_1'} \end{bmatrix},$$

if $N_1 < N_2$ and the rank 2 codebook for a codebook configuration 4 is determined based on the dummy variables including the x and y according to a following codebook table:

| $i_2$ | |
|---|---|
| 0 | 1 |
| $W_{2x,2x,2y,2y,0}^{(2)}$ | $W_{2x,2x,2y,2y,1}^{(2)}$ |
| 2 | 3 |
| $W_{2x+1,2x+1,2y,2y,0}^{(2)}$ | $W_{2x+1,2x+1,2y,2y,1}^{(2)}$ |

| $i_2$ | |
|---|---|
| 4 | 5 |
| $W_{2x+2,2x+2,2y,2y,0}^{(2)}$ | $W_{2x+2,2x+2,2y,2y,1}^{(2)}$ |
| 6 | 7 |
| $W_{2x+3,2x+3,2y,2y,0}^{(2)}$ | $W_{2x+3,2x+3,2y,2y,1}^{(2)}$ |

| $i_2$ | |
|---|---|
| 8 | 9 |
| $W_{2x,2x+1,2y,2y,0}^{(2)}$ | $W_{2x,2x+1,2y,2y,1}^{(2)}$ |
| 10 | 11 |
| $W_{2x+1,2x+2,2y,2y,0}^{(2)}$ | $W_{2x+1,2x+2,2y,2y,1}^{(2)}$ |

| $i_2$ | |
|---|---|
| 12 | 13 |
| $W_{2x,2x+3,2y,2y,0}^{(2)}$ | $W_{2x,2x+3,2y,2y,1}^{(2)}$ |

-continued

| 14 | 15 |
|---|---|
| $W^{(2)}_{2x+1,2x+3,2y,2y,0}$ | $W^{(2)}_{2x+1,2x+3,2y,2y,1}$ | where $$x = i_{1,1},\ y = i_{1,2},\ W^{(2)}_{m_1,m_2,m'_1,m'_2,n} = \frac{1}{\sqrt{2Q}} \begin{bmatrix} w_{m_1,m_2} & w_{m'_1,m'_2} \\ \varphi_n w_{m_1,m_2} & -\varphi_n w_{m'_1,m'_2} \end{bmatrix},$$

if $N_1 \geq N_2$ and $$x = i_{1,2},\ y = i_{1,1},\ W^{(2)}_{m_1,m_2,m'_1,m'_2,n} = \frac{1}{\sqrt{2Q}} \begin{bmatrix} w_{m_2,m_1} & w_{m'_2,m'_1} \\ \varphi_n w_{m_2,m_1} & -\varphi_n w_{m'_2,m'_1} \end{bmatrix},$$

if $N_1 < N_2$ wherein $m_1$ is an index of a first discrete Fourier transform (DFT) vector representing a beam for the first dimension, $m_2$ is an index of a second DFT vector representing a beam for the second dimension, n is an index of the co-phase $\phi_n$, and $$w_{m_1,m_2} = \begin{bmatrix} u_{m_2} & e^{j\frac{2\pi m_1}{O_1 N_1}} u_{m_2} & \cdots & e^{j\frac{2\pi m_1(N_1-1)}{O_1 N_1}} u_{m_2} \end{bmatrix}^T \text{ where}$$

$$u_{m_2} = \begin{bmatrix} 1 & e^{j\frac{2\pi m_2}{O_2 N_2}} & \cdots & e^{j\frac{2\pi m_2(N_2-1)}{O_2 N_2}} \end{bmatrix}, \text{ where } \varphi_n = e^{j\pi n/2}.$$

* * * * *